(12) United States Patent
Seo et al.

(10) Patent No.: US 12,074,956 B2
(45) Date of Patent: Aug. 27, 2024

(54) ELECTRONIC DEVICE AND METHOD FOR OPERATING THEREOF

(71) Applicant: Samsung Electronics Co., Ltd., Suwon-si (KR)

(72) Inventors: Hyunson Seo, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/078,648

(22) Filed: Dec. 9, 2022

(65) Prior Publication Data

US 2023/0179675 A1 Jun. 8, 2023

Related U.S. Application Data

(63) Continuation of application No. PCT/KR2022/019948, filed on Dec. 8, 2022.

(30) Foreign Application Priority Data

Dec. 8, 2021 (KR) .......................... 10-2021-0174508
Jan. 21, 2022 (KR) .......................... 10-2022-0009539

(51) Int. Cl.
*G06F 9/451* (2018.01)
*G06F 3/0484* (2022.01)
(Continued)

(52) U.S. Cl.
CPC .......... *H04L 67/535* (2022.05); *G06F 3/0484* (2013.01); *G06F 9/451* (2018.02);
(Continued)

(58) Field of Classification Search
CPC ... H04L 67/535; H04L 67/306; G06F 3/0484; G06F 9/451; G06F 40/30; G06F 9/453;
(Continued)

(56) References Cited

U.S. PATENT DOCUMENTS 5,726,688 A * 3/1998 Siefert ................ G06F 3/04895
715/840
6,493,006 B1 * 12/2002 Gourdol ................ G06F 3/0482
715/810
(Continued)

FOREIGN PATENT DOCUMENTS

JP 2019-204508 A 11/2019
KR 10-0664172 B1 1/2007
(Continued)

OTHER PUBLICATIONS

International Search Report dated Mar. 24, 2023, issued in an International Application No. PCT/KR2022/019948.

*Primary Examiner* — Yongjia Pan
(74) *Attorney, Agent, or Firm* — Jefferson IP Law, LLP

(57) ABSTRACT

An electronic device is provided. The electronic device includes a display, a memory, and at least one processor operatively connected to the display and the memory. The memory may store instructions, when executed by the at least one processor, cause the at least one processor to recognize a level of a function of an application currently running, based on structure information obtained by classifying functions executable in an application depending on levels, to determine a range of a recommendation command to be provided to a user based at least partly on the structure information and the recognized level, and to provide a user with at least one recommendation command based on the determined range.

18 Claims, 20 Drawing Sheets

(51) Int. Cl.
  *H04L 67/306* (2022.01)
  *H04L 67/50* (2022.01)
  *G06F 40/30* (2020.01)
  *G10L 15/02* (2006.01)
  *G10L 15/08* (2006.01)
  *G10L 15/18* (2013.01)
  *G10L 15/22* (2006.01)
  *G10L 15/30* (2013.01)

(52) U.S. Cl.
  CPC ............ *H04L 67/306* (2013.01); *G06F 40/30* (2020.01); *G10L 15/02* (2013.01); *G10L 2015/088* (2013.01); *G10L 15/1815* (2013.01); *G10L 15/22* (2013.01); *G10L 2015/223* (2013.01); *G10L 15/30* (2013.01)

(58) Field of Classification Search
  CPC ...... G06F 40/216; G06F 40/247; G06F 40/35; G10L 15/02; G10L 15/1815; G10L 15/22; G10L 15/30; G10L 2015/088; G10L 2015/223
  See application file for complete search history.

(56) References Cited

U.S. PATENT DOCUMENTS

| | | | |
|---|---|---|---|
| 8,984,441 B2* | 3/2015 | Eyer | G06F 3/04842 715/811 |
| 9,256,679 B2 | 2/2016 | Chung | |
| 9,262,213 B1* | 2/2016 | Gralhoz | G06F 8/38 |
| 9,886,175 B1* | 2/2018 | Cox | G06F 9/451 |
| 10,440,167 B2 | 10/2019 | Choi et al. | |
| 10,467,029 B1* | 11/2019 | Lin | G06F 9/451 |
| 10,504,518 B1 | 12/2019 | Irani et al. | |
| 10,521,723 B2 | 12/2019 | Hwang et al. | |
| 10,547,729 B2 | 1/2020 | Choi et al. | |
| 10,811,002 B2 | 10/2020 | Cho et al. | |
| 10,852,904 B2 | 12/2020 | Sepczuk | |
| 10,944,859 B2 | 3/2021 | Weinstein et al. | |
| 11,076,039 B2 | 7/2021 | Weinstein et al. | |
| 11,146,670 B2 | 10/2021 | Choi et al. | |
| 11,256,385 B2* | 2/2022 | Spiegel | G06F 3/0482 |
| 11,582,337 B2 | 2/2023 | Choi et al. | |
| 2003/0139901 A1* | 7/2003 | Forman | G06F 17/18 702/179 |
| 2004/0015500 A1* | 1/2004 | Pugliese | G06F 3/0482 707/999.009 |
| 2004/0165012 A1* | 8/2004 | Nelson | G06F 3/0482 715/828 |
| 2005/0054381 A1* | 3/2005 | Lee | G06F 9/451 455/557 |
| 2009/0089751 A1* | 4/2009 | Raikes | G06F 9/453 717/120 |
| 2010/0106737 A1* | 4/2010 | Fitzmaurice | G06F 3/0237 707/769 |
| 2014/0195297 A1 | 7/2014 | Abuelsaad et al. | |
| 2014/0282178 A1* | 9/2014 | Borzello | G06F 9/453 715/771 |
| 2015/0378600 A1* | 12/2015 | Sloan | G06F 3/0482 715/773 |
| 2017/0068400 A1* | 3/2017 | Chiba | G06F 3/0482 |
| 2019/0188013 A1* | 6/2019 | Krishna | G06N 5/04 |
| 2019/0339820 A1* | 11/2019 | Wu | G06N 20/00 |
| 2019/0370292 A1 | 12/2019 | Irani et al. | |
| 2019/0371317 A1 | 12/2019 | Irani et al. | |
| 2021/0092222 A1 | 3/2021 | Kang et al. | |
| 2021/0152684 A1 | 5/2021 | Weinstein et al. | |
| 2021/0182087 A1* | 6/2021 | Park | G06F 3/0484 |

FOREIGN PATENT DOCUMENTS

| | | |
|---|---|---|
| KR | 10-0687492 B1 | 2/2007 |
| KR | 10-0828560 B1 | 5/2008 |
| KR | 10-2009-0105438 A | 10/2009 |
| KR | 10-1042515 B1 | 6/2011 |
| KR | 10-1120040 B1 | 3/2012 |
| KR | 10-2014-0102339 A | 8/2014 |
| KR | 10-1453382 B1 | 10/2014 |
| KR | 10-2017-0054707 A | 5/2017 |
| KR | 10-2018-0068850 A | 6/2018 |
| KR | 10-2018-0076619 A | 7/2018 |
| KR | 10-2018-0083185 A | 7/2018 |
| KR | 10-2018-0109631 A | 10/2018 |
| KR | 10-2019-0114932 A | 10/2019 |
| KR | 10-2072723 B1 | 2/2020 |

* cited by examiner

FIG.8

ELECTRONIC DEVICE AND METHOD FOR OPERATING THEREOF

CROSS-REFERENCE TO RELATED APPLICATION(S)

This application is a continuation application, claiming priority under § 365(c), of an International application No. PCT/KR2022/019948, filed on Dec. 8, 2022, which is based on and claims the benefit of a Korean patent application number 10-2021-0174508, filed on Dec. 8, 2021, in the Korean Intellectual Property Office, and of a Korean patent application number 10-2022-0009539, filed on Jan. 21, 2022, in the Korean Intellectual Property Office, the disclosure of each of which is incorporated by reference herein in its entirety.

TECHNICAL FIELD

The disclosure relates to a device for providing a recommendation command to a user, and a method thereof. More particularly, the disclosure relates to an electronic device capable of providing a recommendation command optimized for each user based on a user's preference, the user's electronic device or application usage history, or the user's usage history of the recommendation command, and a method thereof.

BACKGROUND ART

Nowadays, with the development of a speech recognition technology, a speech recognition function may be implemented in various electronic devices including microphones. For example, an intelligent assistance service capable of providing an intuitive interface between electronic devices has recently been developed. The intelligent assistance service may infer a user's intent by performing natural language processing on the user's utterance, and may allow a control device to be controlled based on the inferred intent of the user.

The above information is presented as background information only to assist with an understanding of the disclosure. No determination has been made, and no assertion is made, as to whether any of the above might be applicable as prior art with regard to the disclosure.

DISCLOSURE

Technical Problem

As functions supported by an electronic device are diversified, a technology capable of providing a recommendation command available to a user may be provided. Moreover, it is possible to provide a recommendation command suitable for each user beyond simply providing a notification of an available function in the electronic device.

Aspects of the disclosure are to address at least the above-mentioned problems and/or disadvantages and to provide at least the advantages described below. Accordingly, an aspect of the disclosure is to provide an electronic device capable of providing a recommendation command optimized for each user based on a user's preference, the user's electronic device or application usage history, or the user's usage history of the recommendation command, and a method thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a display, a memory, and at least one processor operatively connected to the display and the memory. The memory may store instructions, when executed by the at least one processor, cause the at least one processor to recognize a level of a function of an application currently running, based on structure information obtained by classifying functions executable in an application depending on levels, to determine a range of a recommendation command to be provided to a user based at least partly on the structure information and the recognized level, and to provide a user with at least one recommendation command based on the determined range.

In accordance with another aspect of the disclosure, a method of operating an electronic device is provided. The method includes recognizing a level of a function of an application currently running, based on structure information obtained by classifying functions executable in an application depending on levels, determining a range of a recommendation command to be provided to a user based at least partly on the structure information and the recognized level, and providing a user with at least one recommendation command based on the determined range.

Advantageous Effects

According to embodiments of the disclosure, it is possible to provide a recommendation command optimized for each user based on a user's preference, the user's electronic device or application usage history, or the user's usage history of the recommendation command.

According to embodiments of the disclosure, it is possible to recognize a level of a function of the currently running application based on structure information obtained by classifying functions executable in an application depending on levels, and to provide a recommendation command suitable for a user and the user's usage state depending on the structure information and the recognized level.

Besides, a variety of effects directly or indirectly understood through the specification may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 8 is a diagram for describing an operation of an electronic device, according to an embodiment of the disclosure;

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
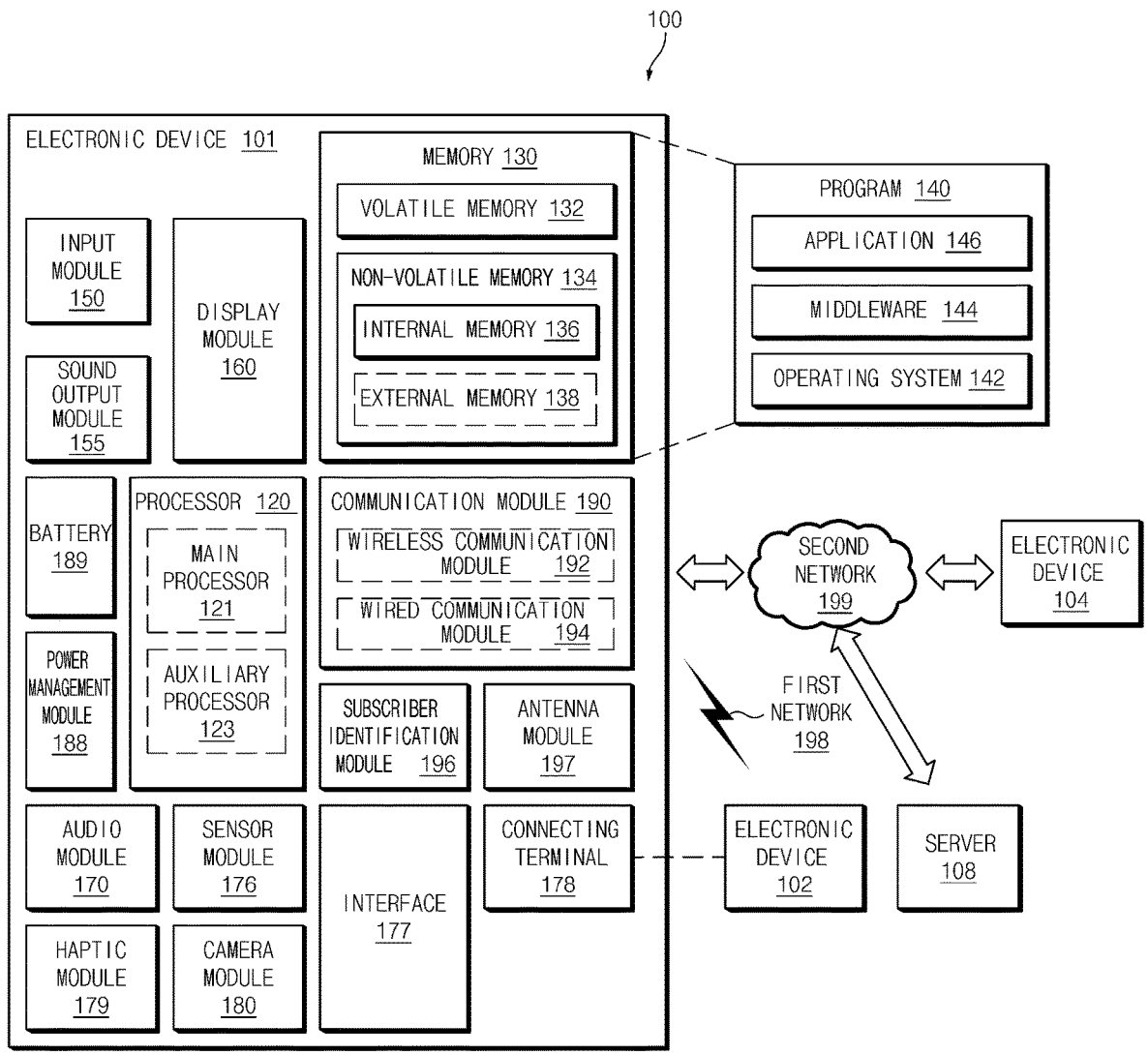
FIG. 1 is a block diagram illustrating an electronic device 101 in a network environment 100 according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the displays, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module.

According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
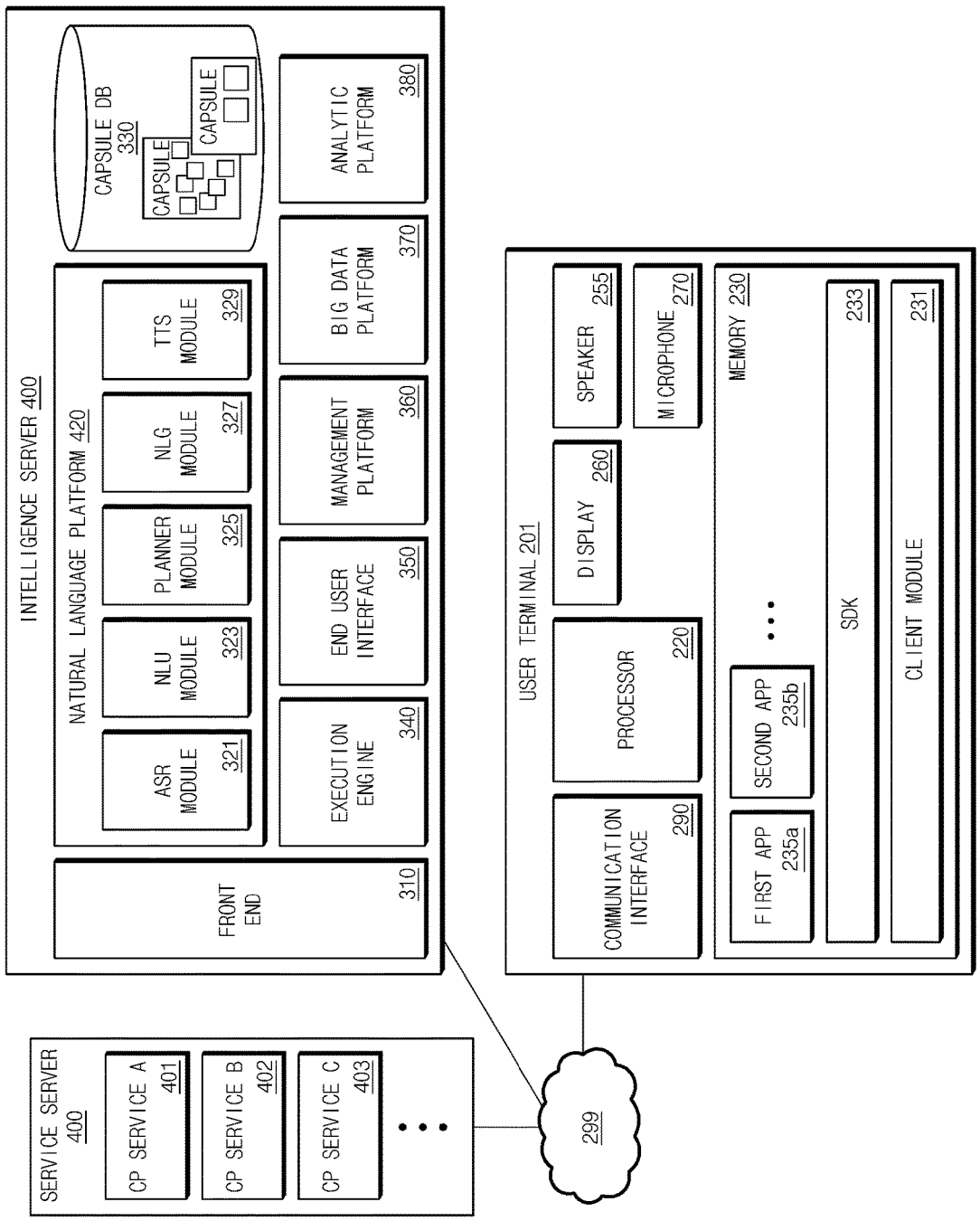
FIG. 2 is a block diagram illustrating an integrated intelligence system, according to an embodiment of the disclosure.

FIG. 2 is a block diagram illustrating an integrated intelligence system, according to an embodiment of the disclosure.

Referring to FIG. 2, an integrated intelligence system according to an embodiment may include a user terminal 201, an intelligence server 300, and a service server 400. The service server 400 may include a CP service A 401, a CP service B 402, a CP service C 403.

The user terminal 201 according to an embodiment may be a terminal device (or an electronic device) capable of connecting to Internet, and may be, for example, a mobile phone, a smartphone, a personal digital assistant (PDA), a notebook computer, a television (TV), a household appliance, a wearable device, a head mounted display (HMD), or a smart speaker.

According to an embodiment of the disclosure, the user terminal 201 may include a communication interface 290, a microphone 270, a speaker 255, a display 260, a memory 230, or a processor 220. The listed components may be operatively or electrically connected to one another.

The communication interface 290 according to an embodiment may be connected to an external device and may be configured to transmit or receive data to or from the external device. The microphone 270 according to an embodiment may receive a sound (e.g., a user utterance) to convert the sound into an electrical signal. The speaker 255 according to an embodiment may output the electrical signal as sound (e.g., voice). The display 260 according to an embodiment may be configured to display an image or a video. The display 260 according to an embodiment may display the graphic user interface (GUI) of the running app (or an application program).

The memory 230 according to an embodiment may store a client module 231, a software development kit (SDK) 233, and a plurality of apps 335. The client module 231 and the SDK 233 may constitute a framework (or a solution program) for performing general-purposed functions. Furthermore, the client module 231 or the SDK 233 may constitute the framework for processing a voice input.

The plurality of apps 235 may be programs for performing a specified function. According to an embodiment of the disclosure, the plurality of apps 235 may include a first app 235a and/or a second app 235b. According to an embodiment of the disclosure, each of the plurality of apps 235 may include a plurality of actions for performing a specified function. For example, the apps may include an alarm app, a message app, and/or a schedule app. According to an embodiment of the disclosure, the plurality of apps 235 may be executed by the processor 220 to sequentially execute at least part of the plurality of actions.

According to an embodiment of the disclosure, the processor 220 may control overall operations of the user terminal 201. For example, the processor 220 may be electrically connected to the communication interface 290, the microphone 270, the speaker 255, and the display 260 to perform a specified operation. For example, the processor 220 may include at least one processor.

Moreover, the processor 220 according to an embodiment may execute the program stored in the memory 230 so as to perform a specified function. For example, according to an embodiment of the disclosure, the processor 220 may execute at least one of the client module 231 or the SDK 233 so as to perform a following operation for processing a voice input. The processor 220 may control operations of the plurality of apps 235 via the SDK 233. The following actions described as the actions of the client module 231 or the SDK 233 may be the actions performed by the execution of the processor 220.

According to an embodiment of the disclosure, the client module 231 may receive a voice input. For example, the client module 231 may receive a voice signal corresponding to a user utterance detected through the microphone 270. The client module 231 may transmit the received voice input (e.g., a voice input) to the intelligence server 300. The client module 231 may transmit state information of the user terminal 201 to the intelligence server 300 together with the received voice input. For example, the state information may be execution state information of an app.

According to an embodiment of the disclosure, the client module 231 may receive a result corresponding to the received voice input. For example, when the intelligence server 300 is capable of calculating the result corresponding to the received voice input, the client module 231 may receive the result corresponding to the received voice input. The client module 231 may display the received result on the display 260.

According to an embodiment of the disclosure, the client module 231 may receive a plan corresponding to the received voice input. The client module 231 may display, on the display 260, a result of executing a plurality of actions of an app depending on the plan. For example, the client module 231 may sequentially display the result of executing the plurality of actions on a display. For another example, the user terminal 201 may display only a part of results (e.g., a result of the last action) of executing the plurality of actions, on the display.

According to an embodiment of the disclosure, the client module 231 may receive a request for obtaining information necessary to calculate the result corresponding to a voice input, from the intelligence server 300. According to an embodiment of the disclosure, the client module 231 may transmit the necessary information to the intelligence server 300 in response to the request.

According to an embodiment of the disclosure, the client module 231 may transmit, to the intelligence server 300, information about the result of executing a plurality of actions depending on the plan. The intelligence server 300 may identify that the received voice input is correctly processed, using the result information.

According to an embodiment of the disclosure, the client module 231 may include a speech recognition module. According to an embodiment of the disclosure, the client module 231 may recognize a voice input for performing a limited function, via the speech recognition module. For example, the client module 231 may launch an intelligence app for processing a specific voice input by performing an organic action, in response to a specified voice input (e.g., wake up!).

According to an embodiment of the disclosure, the intelligence server 300 may receive information associated with a user's voice input from the user terminal 201 over a communication network 299. According to an embodiment of the disclosure, the intelligence server 300 may convert data associated with the received voice input to text data. According to an embodiment of the disclosure, the intelligence server 300 may generate at least one plan for performing a task corresponding to the user's voice input, based on the text data.

According to an embodiment of the disclosure, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment of the disclosure, the plan may be selected from a set of predefined plans or may be generated in real time in response to a user's request. For example, the AI system may select at least one plan of the plurality of predefined plans.

According to an embodiment of the disclosure, the intelligence server 300 may transmit a result according to the generated plan to the user terminal 201 or may transmit the generated plan to the user terminal 201. According to an embodiment of the disclosure, the user terminal 201 may display the result according to the plan, on a display. According to an embodiment of the disclosure, the user terminal 201 may display a result of executing the action according to the plan, on the display.

The intelligence server 300 according to an embodiment may include a front end 310, a natural language platform 320, a capsule database 330, an execution engine 340, an end user interface 350, a management platform 360, a big data platform 370, or an analytic platform 380.

According to an embodiment of the disclosure, the front end 310 may receive a voice input received from the user terminal 201. The front end 310 may transmit a response corresponding to the voice input to the user terminal 201.

According to an embodiment of the disclosure, the natural language platform 320 may include an automatic speech recognition (ASR) module 321, a natural language understanding (NLU) module 323, a planner module 325, a natural language generator (NLG) module 327, and/or a text to speech module (TTS) module 329.

According to an embodiment of the disclosure, the ASR module 321 may convert the voice input received from the user terminal 201 into text data. According to an embodiment of the disclosure, the NLU module 323 may grasp the intent of the user, using the text data of the voice input. For example, the NLU module 323 may grasp the intent of the user by performing syntactic analysis or semantic analysis. According to an embodiment of the disclosure, the NLU module 323 may grasp the meaning of words extracted from the voice input by using linguistic features (e.g., syntactic elements), such as morphemes or phrases and may determine the intent of the user by matching the grasped meaning of the words to the intent.

According to an embodiment of the disclosure, the planner module 325 may generate the plan by using a parameter and the intent that is determined by the NLU module 323. According to an embodiment of the disclosure, the planner module 325 may determine a plurality of domains necessary to perform a task, based on the determined intent. The planner module 325 may determine a plurality of actions included in each of the plurality of domains determined based on the intent. According to an embodiment of the disclosure, the planner module 325 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 325 may determine the relationship between the plurality of actions and the plurality of concepts stepwise (or hierarchically). For example, the planner module 325 may determine the execution sequence of the plurality of actions, which are determined based on the user's intent, based on the plurality of concepts. In other words, the planner module 325 may determine an execution sequence of the plurality of actions, based on the parameters necessary to perform the plurality of actions and the result output by the execution of the plurality of actions. Accordingly, the planner module 325 may generate a plan including information (e.g., ontology) about the relationship between the plurality of actions and the plurality of concepts. The planner module 325 may generate the plan, using information stored in the capsule database (DB) 330 storing a set of relationships between concepts and actions.

According to an embodiment of the disclosure, the NLG module 327 may change specified information into information in a text form. The information changed to the text form may be in the form of a natural language speech. The TTS module 329 according to an embodiment may change information in the text form to information in a voice form.

According to an embodiment of the disclosure, all or part of the functions of the natural language platform 320 may be also implemented in the user terminal 201.

The capsule DB 330 may store information about the relationship between the actions and the plurality of concepts corresponding to a plurality of domains. According to an embodiment of the disclosure, the capsule may include a plurality of action objects (or action information) and concept objects (or concept information) included in the plan. According to an embodiment of the disclosure, the capsule DB 330 may store the plurality of capsules in a form of a concept action network (CAN). According to an embodiment of the disclosure, the plurality of capsules may be stored in the function registry included in the capsule DB 330.

The capsule DB 330 may include a strategy registry that stores strategy information necessary to determine a plan corresponding to a voice input. When there are a plurality of plans corresponding to the voice input, the strategy information may include reference information for determining one plan. According to an embodiment of the disclosure, the capsule DB 330 may include a follow-up registry that stores information of the follow-up action for suggesting a follow-up action to the user in a specified context. For example, the follow-up action may include a follow-up utterance. According to an embodiment of the disclosure, the capsule DB 330 may include a layout registry storing layout information of information output via the user terminal 201. According to an embodiment of the disclosure, the capsule DB 330 may include a vocabulary registry storing vocabulary information included in capsule information. According to an embodiment of the disclosure, the capsule DB 330 may include a dialog registry storing information about dialog (or interaction) with the user. The capsule DB 330 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 330 according to an embodiment may be also implemented in the user terminal 201.

According to an embodiment of the disclosure, the execution engine 340 may calculate a result by using the generated plan. The end user interface 350 may transmit the calculated result to the user terminal 201. Accordingly, the user terminal 201 may receive the result and may provide the user with the received result. According to an embodiment of the disclosure, the management platform 360 may manage information used by the intelligence server 300. According to an embodiment of the disclosure, the big data platform 370 may collect data of the user. According to an embodiment of the disclosure, the analytic platform 380 may manage quality of service (QoS) of the intelligence server 300. For example, the analytic platform 380 may manage the component and processing speed (or efficiency) of the intelligence server 300.

According to an embodiment of the disclosure, the service server 400 may provide the user terminal 201 with a specified service (e.g., ordering food or booking a hotel). According to an embodiment of the disclosure, the service server 400 may be a server operated by the third party. According to an embodiment of the disclosure, the service server 400 may provide the intelligence server 300 with information for generating a plan corresponding to the received voice input. The provided information may be stored in the capsule DB 330. Furthermore, the service server 400 may provide the intelligence server 300 with result information according to the plan.

In the above-described integrated intelligence system, the user terminal 201 may provide the user with various intelligent services in response to a user input. The user input may include, for example, an input through a physical button, a touch input, or a voice input.

According to an embodiment of the disclosure, the user terminal 201 may provide a speech recognition service via an intelligence app (or a speech recognition app) stored therein. In this case, for example, the user terminal 201 may recognize a user utterance or a voice input, which is received via the microphone, and may provide the user with a service corresponding to the recognized voice input.

According to an embodiment of the disclosure, the user terminal 201 may perform a specified action, based on the received voice input, independently, or together with the intelligence server 300 and/or the service server 400. For example, the user terminal 201 may launch an app corresponding to the received voice input and may perform the specified action via the executed app.

According to an embodiment of the disclosure, when providing a service together with the intelligence server 300 and/or the service server 400, the user terminal 201 may detect a user utterance by using the microphone 270 and may generate a signal (or voice data) corresponding to the detected user utterance. The user terminal may transmit the voice data to the intelligence server 300 by using the communication interface 290.

According to an embodiment of the disclosure, the intelligence server 300 may generate a plan for performing a task corresponding to the voice input or the result of performing an action depending on the plan, as a response to the voice input received from the user terminal 201. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and/or the plurality of concepts.

According to an embodiment of the disclosure, the user terminal 201 may receive the response by using the communication interface 290. The user terminal 201 may output the voice signal generated in the user terminal 201 to the outside by using the speaker 255 or may output an image generated in the user terminal 201 to the outside by using the display 260.

Referring to FIG. 2, it is described that speech recognition of a voice input received from the user terminal 201, understanding and generating a natural language, and calculating a result by using a plan are performed on the intelligence server 300. However, various embodiments of the disclosure are not limited thereto. For example, at least part of configurations (e.g., the natural language platform 320, the execution engine 340, and the capsule DB 330) of the intelligence server 300 may be embedded in the user terminal 201 (or the electronic device 101 of FIG. 1), and the operation thereof may be performed by the user terminal 201.

Figure 3:
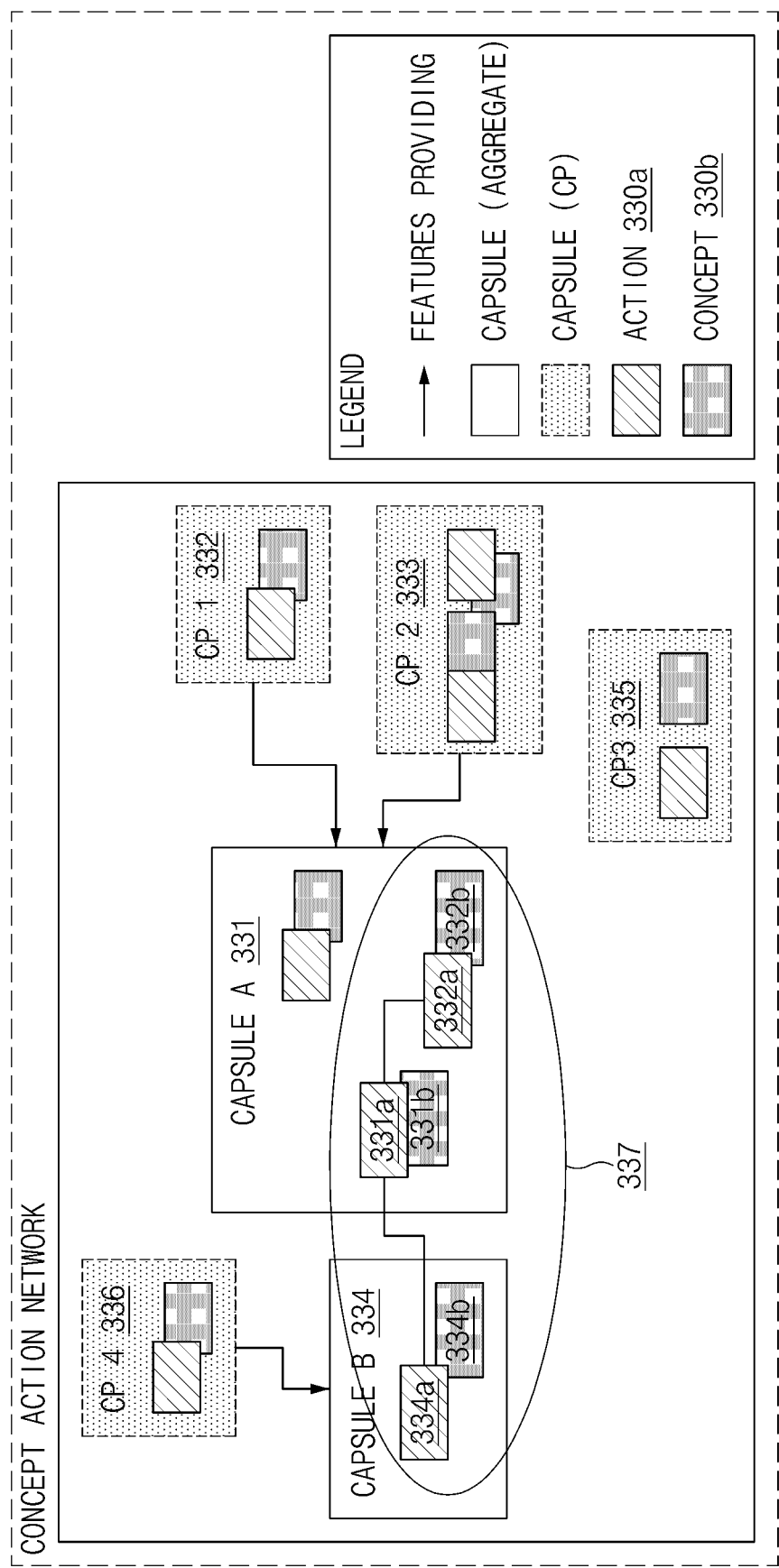
FIG. 3 is a diagram illustrating the form in which relationship information between a concept and an action is stored in a database, according to an embodiment of the disclosure.

FIG. 3 is a diagram illustrating a form in which relationship information between a concept and an action is stored in a database, according to an embodiment of the disclosure.

A capsule database (e.g., the capsule DB 330) of the intelligence server 200 may store a capsule in the form of a CAN. The capsule DB may store an action for processing a task corresponding to a user's voice input and a parameter necessary for the action, in the CAN form.

Referring to FIG. 3, the capsule DB may store a plurality capsules (a capsule A 331 and a capsule B 334) respectively corresponding to a plurality of domains (e.g., applications). According to an embodiment of the disclosure, a single capsule (e.g., the capsule A 331) may correspond to a single domain (e.g., a location (geo) or an application). Furthermore, at least one service provider (e.g., CP 1 332, CP 2 333, or CP 4 336) for performing a function for a domain associated with the capsule may correspond to one capsule. According to an embodiment of the disclosure, the single capsule may include at least one or more actions 330a and at least one or more concepts 330b for performing a specified function.

The natural language platform 220 may generate a plan for performing a task corresponding to the received voice input, using the capsule stored in a capsule database. For example, the planner module 225 of the natural language platform may generate the plan by using the capsule stored in the capsule database. For example, a plan 337 may be generated by using actions 331a and 332a and concepts 331b and 332b of the capsule A 330a and an action 334a and a concept 334b of the capsule B 334.

Figure 4:
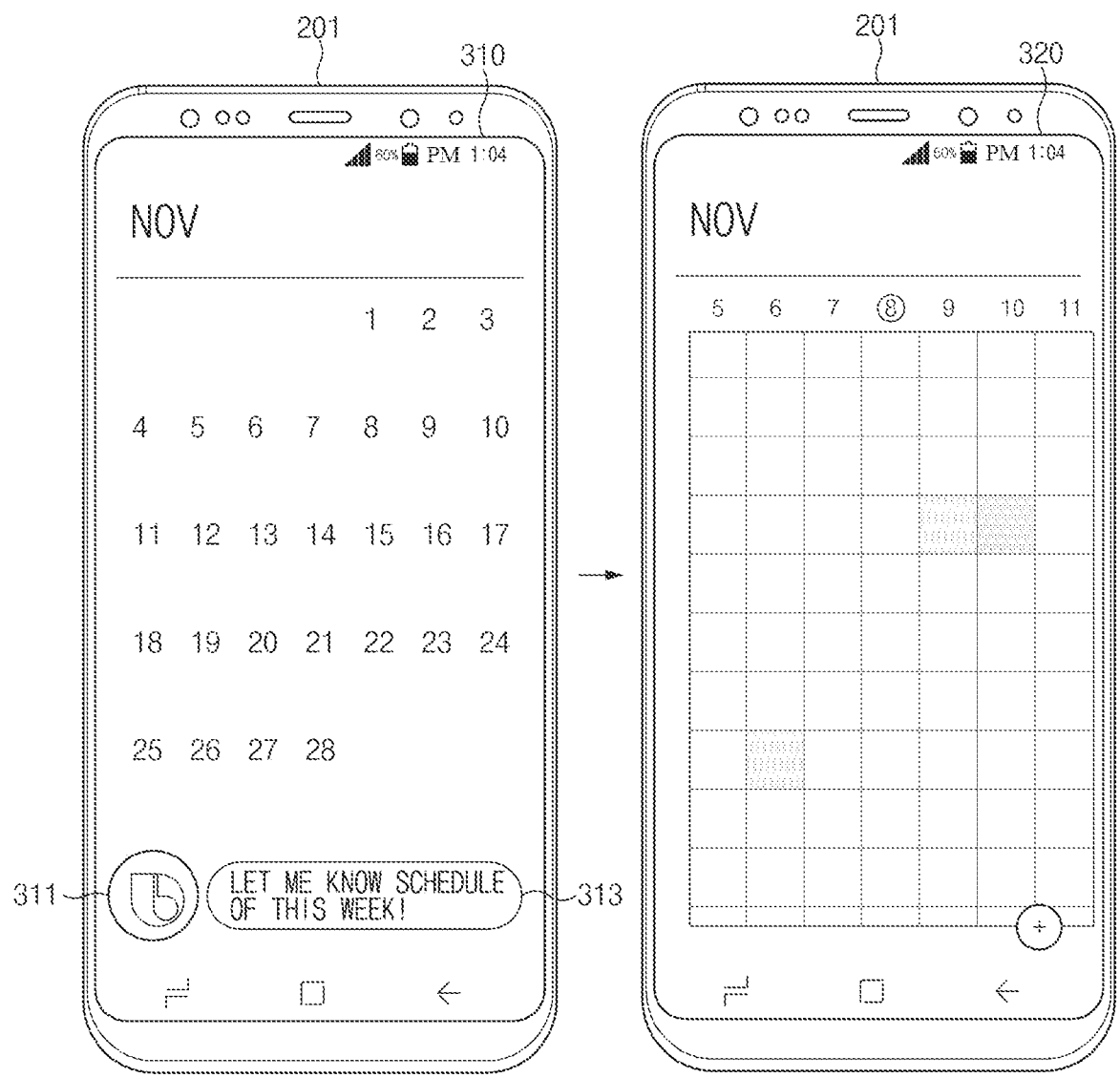
FIG. 4 is a view illustrating a user terminal displaying a screen of processing a voice input received through an intelligence app, according to an embodiment of the disclosure.

FIG. 4 is a view illustrating a screen in which a user terminal processes a voice input received through an intelligence app, according to an embodiment of the disclosure.

Referring to FIG. 4, the user terminal 201 may execute an intelligence app to process a user input through the intelligence server 200.

According to an embodiment of the disclosure, on screen 210, when recognizing a specified voice input (e.g., wake up!) or receiving an input via a hardware key (e.g., a dedicated hardware key), the user terminal 201 may launch an intelligence app for processing a voice input. For example, the user terminal 201 may launch the intelligence app in a state where a schedule app is executed. According to an embodiment of the disclosure, the user terminal 201 may display an object (e.g., an icon) 211 corresponding to the intelligence app, on the display 260. According to an embodiment of the disclosure, the user terminal 201 may receive a voice input by a user utterance. For example, the user terminal 201 may receive a voice input saying that "let me know the schedule of this week!". According to an embodiment of the disclosure, the user terminal 201 may display a user interface (UI) 213 (e.g., an input window) of the intelligence app, in which text data of the received voice input is displayed, on a display.

According to an embodiment of the disclosure, on screen 215, the user terminal 201 may display a result corresponding to the received voice input, on the display. For example, the user terminal 201 may receive a plan corresponding to the received user input 311 and may display 'the schedule of this week' 313 on the display depending on the plan.

Figure 5:
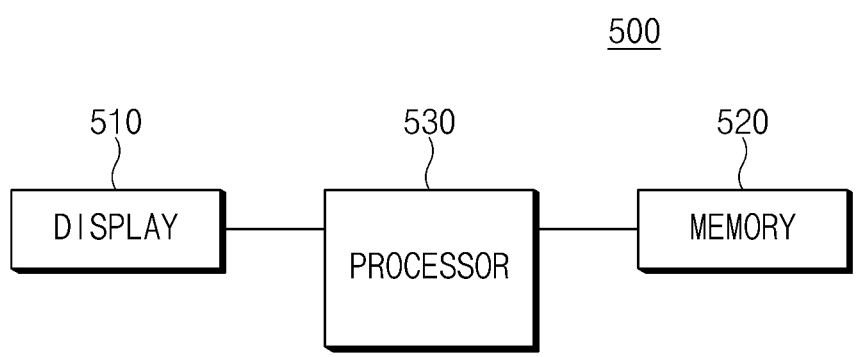
FIG. 5 is a block diagram of an electronic device, according to an embodiment of the disclosure.

FIG. 5 is a block diagram of an electronic device, according to an embodiment of the disclosure.

Referring to FIG. 5, according to an embodiment of the disclosure, an electronic device 500 (e.g., the electronic device 101 of FIG. 1 or the user terminal 201 of FIGS. 2 to 4) may include a display 510 (e.g., the display module 160 of FIG. 1 or the display 260 of FIG. 2), a memory 520 (e.g., the memory 130 in FIG. 1 or the memory 230), and a processor 530 (e.g., the processor 120 of FIG. 1 or the processor 220 of FIG. 2).

According to an embodiment of the disclosure, the display 510 may visually provide data to a user. For example, the display 510 may visually provide the user with a recommendation command. For example, the display 510 may display a user interface related to performing a function of an application (e.g., the application 146 of FIG. 1).

According to an embodiment of the disclosure, the memory 520 may store instructions that, when executed by the processor 530, cause the processor 530 to control an operation of the electronic device 500. According to an embodiment of the disclosure, the memory 520 may at least temporarily store data used to perform an operation of the electronic device 500. For example, the memory 520 may store a user's application usage history, the user's recommendation command usage history, a user profile, a recommendation command, and/or structure information obtained by classifying functions executable in an application depending on levels.

According to an embodiment of the disclosure, the processor 530 may recognize a function level of an application currently running, based on the structure information from classifying functions executable in the application depending on levels. According to an embodiment of the disclosure, the processor 530 may generate the structure information based on an association (e.g., a user interface structure, an entry path, and/or a relevance corresponding to each function) between functions of the application or may obtain the structure information included in the application from the application. For example, the structure information may be in a form of a graph having functions of the application, and connection information between functions, but is not limited thereto.

According to an embodiment of the disclosure, the processor 530 may determine a range of the recommendation command to be provided to the user based at least partly on the structure information and the recognized level. For example, the processor 530 may determine that functions corresponding to a level adjacent to the recognized level are within a range of the recommendation command, with reference to the structure information based on the recognized level. According to an embodiment of the disclosure, the processor 530 may determine a range of the recommendation command based at least partly on the user's profile. For example, the processor 530 may generate or update a user's profile based on at least part of the usage history of the user's application or the user's recommendation command usage history. For example, the usage history of the application may include the history of functions, which are used in connection with each other, from among a function of the application and a function of another application.

According to an embodiment of the disclosure, the processor 530 may determine the association between functions of the application based on at least one of structure information, information included in a user interface corresponding to each function of the application, an association value between functions specified in the application, and a usage history of the user's application. For example, the processor 530 may determine a range of a recommendation command based on the determined association between the functions.

For example, the processor 530 may determine the association between functions for each user and may store information of the determined association between functions for each user in the memory 520.

According to an embodiment of the disclosure, the processor 530 may determine the range of a recommendation command based on the user's recommendation command usage history. For example, the processor 530 may determine the user's preference or priority for each function of the application based on the user's recommendation command usage history. The processor 530 may determine the range of the recommendation command based on the determined preference or priority. For example, when the user's recommendation command usage frequency is greater than or equal to a specified value, the processor 530 may determine the range of the recommendation command to include a recommendation command corresponding to a function with a higher level than that of the recognized function. When the user's recommendation command usage frequency is less than the specified value, the processor 530 may determine the range of the recommendation command to include a recommendation command corresponding to a function with a level that is not greater than that of the recognized function.

According to an embodiment of the disclosure, the processor 530 may determine the degree of association between a function of the running application and a function of another application based on at least part of the structure information of the application and the user's application usage history. The processor 530 may include at least one of functions of another application in the range of the recommendation command based on the determined degree of association. For example, in addition to the function of the currently running application (current domain), the processor 530 may include functions of different applications (different domains) in the range of a recommendation command based on at least part of the structure information, the user's application usage history, or the recommendation command usage history.

According to an embodiment of the disclosure, the processor 530 may provide at least one recommendation command to the user based on the determined range. According to an embodiment of the disclosure, the processor 530 may determine a method of providing at least one recommendation command or an order for providing recommendation commands based on the user's preference or priority for each of the functions of the application. For example, the processor 530 may first provide a recommendation command having a high preference (priority) of the user or may sort and provide a plurality of recommendation commands in the order having the high preference. According to an embodiment of the disclosure, the processor 530 may determine a time point at which a recommendation command is to be provided, based on at least part of the structure information and the user's profile. The time point at which a recommendation command is to be provided may include at least one of a time point at which an application or another application is executed, a time point at which a specified function of the application is executed, a time point at which the electronic device 500 is positioned at a specified location, a specified time (a time point), a time point at which a user input is received, a time point at which a specified context condition is satisfied, or a time point at which the electronic device 500 uses an assistant function.

According to an embodiment of the disclosure, at least part of operations of the processor 530 may be performed by an external electronic device (e.g., the intelligent server 300 of FIG. 2), or may be performed by the electronic device 500 and the external electronic device in connection with each other (e.g., the integrated intelligent system of FIG. 2). For example, the electronic device 500 may transmit the user's application usage history, the user's recommendation command usage history, and/or information related to a function of the running application to the external electronic device, may receive the information of the recommendation command from the external electronic device, and may provide the recommendation command to the user.

According to an embodiment of the disclosure, the electronic device 500 may further include at least part of components of the electronic device 101 or the user terminal 201 illustrated in FIGS. 1 to 4. For example, the electronic device 500 may further include a microphone (e.g., the input module 150 of FIG. 1 or the microphone 270 of FIG. 2) for receiving a voice input from the user.

According to an embodiment of the disclosure, the electronic device 500 may recognize a level of a function being employed by the user, based on structure information obtained by structurally and hierarchically analyzing a usage pattern (e.g., a usage pattern of an application) of the electronic device 500 of the user, and then may provide a recommendation command by determining a range of functions likely to be employed by the user. Accordingly, the electronic device 500 may provide the recommendation command suitable for a usage situation of the electronic device 500 of the user. Furthermore, the electronic device 500 may provide a recommendation command optimized for each user by dynamically determining the range of a recommendation command personalized for each user based on the user's recommendation command usage history.

Figure 6:
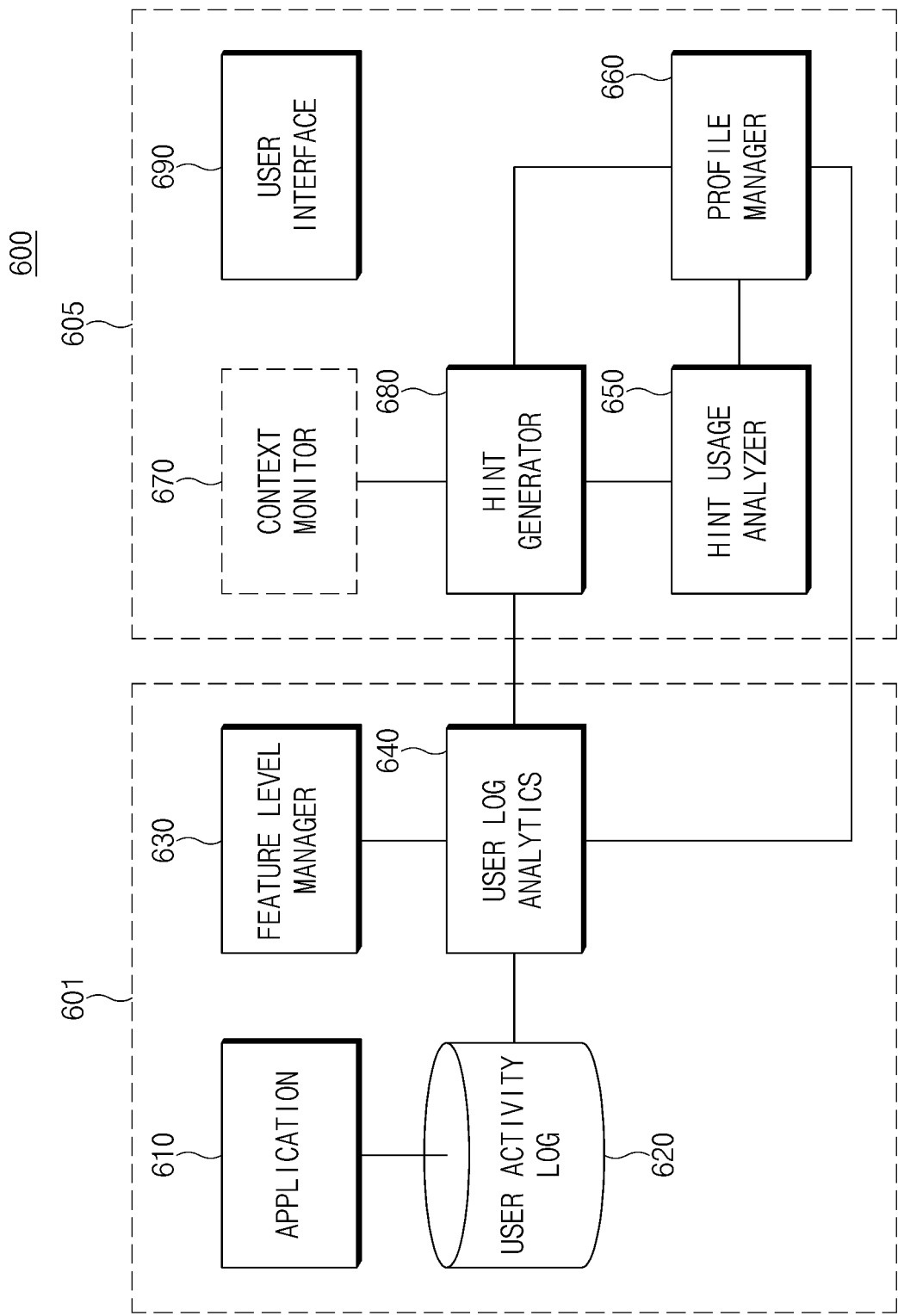
FIG. 6 is a block diagram of an electronic device, according to an embodiment of the disclosure.

FIG. 6 is a block diagram of an electronic device, according to an embodiment of the disclosure.

Referring to FIG. 6, according to an embodiment of the disclosure, an electronic device (e.g., the electronic device 101 of FIG. 1, the user terminal 201 of FIGS. 2 to 4, or the electronic device 500 of FIG. 5) may include a log analysis & level determination unit 601, and a hint provision & profile management unit 605. According to an embodiment of the disclosure, the log analysis & level determination unit 601 and the hint provision & profile management unit 605 may be implemented as one module. Alternatively, each of configurations of the log analysis & level determination unit 601 and the hint provision & profile management unit 605 may be implemented as an independent module.

According to an embodiment of the disclosure, the log analysis & level determination unit 601 may include an application 610, a user activity log 620, a feature level manager 630, and user log analytics 640.

According to an embodiment of the disclosure, the electronic device may store the various applications 610.

According to an embodiment of the disclosure, the user activity log 620 may include the usage history of the application 610 of a user. For example, the user activity log 620 may include information about a time in which the user employs the application 610 (e.g., the application 146 of FIG. 1), a place at which the user employs the application 610, and a situation in which the user employs the application 610, a user input related to the application 610, and/or a function of the application 610 employed by the user. The user activity log 620 may be a database that stores a usage history of the electronic device 600 of the user. The user activity log 620 may be stored in a memory (e.g., the memory 130 of FIG. 1, the memory 230 of FIG. 2, or the memory 520 of FIG. 5) of the electronic device.

According to an embodiment of the disclosure, the feature level manager 630 may generate or manage the structure information obtained by classifying functions executable in the application 610 depending on levels. For example, the structure information may be information in a form of a graph indicating the structure of the application 610, but is not limited thereto. For example, the structure information in a form of a graph will be described with reference to FIG. 7 below.

For example, the structure information may be determined based on an entry path of a user interface 690 that provides a function of the application 610 in the application 610. An example of determining structure information based on an entry path of the user interface 690 will be described with reference to FIG. 8 below.

For example, the structure information may be included in the application 610 in advance. For example, the structure information obtained by classifying functions of the application 610 depending on levels may be included in the application 610 in advance by a developer of the application 610. In this case, the feature level manager 630 may obtain the structure information from the corresponding application 610.

For example, the feature level manager 630 may recognize a level, to which each function of the application 610 belongs, based on the structure information.

TABLE 1

| Execution function | Description | Function level |
| --- | --- | --- |
| Applications: open_calendar | Open calendar | Level 1 |
| Applications: new_calendar | Add new schedule | Level 2 |
| Applications: scan_schedule | Scan schedule | Level 2 |
| Applications: set_alarm | Set schedule reminder | Level 3 |
| Applications: set_location | Set schedule place | Level 3 |
| Applications: set_guest | Set schedule guest | Level 3 |
| Applications: set_repeat_enable | Set schedule reminder repeat | Level 4 |

For example, Table 1 illustrates an execution function, a description, and a function level of the calendar application 610. For example, a table in Table 1 may be in a form of structure information. For example, the feature level manager 630 may recognize a level for each function of the calendar application 610 based on the structure information and may recognize the function and level of the application 610 that have already run or are currently running.

According to an embodiment of the disclosure, the user log analytics 640 may analyze a usage history of the user's application 610 based on the user activity log 620. For example, the user log analytics 640 may obtain and analyze information of a function of the user's application 610 that has been used or is being used. For example, the user log analytics 640 may analyze an input of the user, the application 610 that is executed (opened), a function that is executed, and a domain in which the function is executed.

For example, the user log analytics 640 may structurally analyze a usage state of the user's electronic device based on the structure information received from the feature level manager 630. The user log analytics 640 may recognize a level of an operation corresponding to a function being currently employed by the user, based on the structure information.

For example, Table 2 illustrates examples of functions performed by the user in the calendar application 610.

TABLE 2

| Execution function | Description | Function level |
|---|---|---|
| Applications: open_calendar | Open calendar | Level 1 |
| Applications: new_calendar | Add new schedule | Level 2 |
| Applications: set_guest | Set schedule guest | Level 3 |
| Applications: set_location | Set schedule place | Level 3 |

For example, the user log analytics 640 may recognize a function, which has been performed or is being performed by the user in the calendar application 610, and a level of the corresponding function. For example, the user log analytics 640 may recognize that the user is performing a schedule location setting function of the calendar application 610 of level 3.

According to an embodiment of the disclosure, the hint provision & profile management unit 605 may include a hint usage analyzer 650, a profile manager 660, a context monitor 670, a hint generator 680, and the user interface 690. Hereinafter, a hint means information of functions capable of being performed in the electronic device (or the application 610) provided to the user. The hint includes a 'recommendation command' described in various embodiments of the disclosure.

According to an embodiment of the disclosure, the hint usage analyzer 650 may analyze the user's hint usage history. For example, the hint usage analyzer 650 may determine whether the user has employed a provided hint. For example, when the electronic device provides a plurality of hints, the hint usage analyzer 650 may recognize the hint selected or employed by the user. For example, the hint usage analyzer 650 may recognize whether a hint selected or employed by the user is a hint corresponding to a function of a higher level than a level of a function being executed, or whether the hint is a hint corresponding to a function of a level that is not greater than the level of the function being executed. The hint usage analyzer 650 may analyze a hint usage pattern and/or hint preference of the user based on the user's hint usage history. The hint usage analyzer 650 may analyze the user's hint usage frequency. The hint usage analyzer 650 may analyze whether the user prefers a hint corresponding to a function of a higher level than a function being executed, or whether the user prefers a hint corresponding to a function that is not greater than a level of the function being executed. The hint usage analyzer 650 may analyze whether a user prefers a hint corresponding to a function of the application 610 being executed, or whether a user prefers a hint corresponding to a function of the application 610 that is different from the application 610 being executed.

According to an embodiment of the disclosure, the profile manager 660 may receive information, which is obtained by analyzing the user's hint usage history, from the hint usage analyzer 650. The profile manager 660 may receive information, which is obtained by analyzing the user's activity log, from the user log analytics 640. According to an embodiment of the disclosure, the profile manager 660 may generate or update a user profile based on information obtained by analyzing the user's hint usage history and/or information obtained by analyzing the user's activity log. For example, a user profile may be used to determine a hint range personalized for each user. For example, the profile manager 660 may generate or update the user profile based on the user's hint usage history (e.g., the user's hint usage priority, preference, and/or hint usage pattern) and a usage history (e.g., a frequency at which a conjunction between functions of the application 610 is made, a function level of the application 610 used by the user, and/or a history of the application 610 used in conjunction) of the user's application 610. For example, the profile manager 660 may provide a user profile to the hint generator 680.

According to an embodiment of the disclosure, the context monitor 670 may monitor a usage state of the electronic device of the user. For example, the context monitor 670 may monitor a usage history of the electronic device of the user. For example, the context monitor 670 may determine a time point at which a hint is provided. For example, the time point at which a hint is provided may include at least one of a time point at which a user input is received, a time point at which the application 610 is executed, a time point at which the specified function of the application 610 is executed, a time point at which the electronic device is positioned at a specified location, a specified time (a time point), or a time point at which a assistant function is used in the electronic device. According to an embodiment of the disclosure, the context monitor 670 may provide the user with the hint generated by the hint generator 680 at a time point at which the determined hint is provided, or may provide the hint generator 680 with information at a time point at which the determined hint is provided.

According to an embodiment of the disclosure, the hint generator 680 may determine a range of a hint to be provided to the user, and may finally determine the hint to be provided to the user. The hint generator 680 may receive information obtained by analyzing the user's hint usage history from the hint usage analyzer 650, may receive information obtained by analyzing the user's activity log from the user log analytics 640, and/or may receive a user profile from the profile manager 660. The hint generator 680 may determine a range of a hint to be provided to the user, based on information obtained by analyzing the user's hint usage history, information obtained by analyzing the user's activity log, and/or a user profile. For example, the hint generator 680 may determine a range of a hint to be provided to the user based at least partly on the structure information. For example, the hint generator 680 may recognize a function of the application 610, which is being currently employed by the user, based on the structure information and may determine a level of the function of the application 610 to be provided as a hint to the user based on the recognized result. The hint generator 680 may determine functions of a level adjacent to a level of the function being executed, to be in a hint range based on the structure information. The hint generator 680 may determine that functions related to the function being executed are within the hint range based on structure information. The hint generator 680 may determine the hint range based on a predetermined value in the application 610. The hint generator 680 may determine the hint range based on the user's previous usage history of the application 610. The hint generator 680 may determine the hint range based on a history of the user's usage of a hint thus previously provided. The hint generator 680 may determine not only a function of the application 610 currently being used, but also a function of the other related application 610 to be in a range of the hint. The hint generator 680 may determine the range of functions, which the user is likely to perform after the function of the application 610 currently being executed, based on structure information, information obtained by analyzing the user's hint usage history, information obtained by analyzing the user's activity log, and/or a user profile and may provide the user with at least one of hints for functions included in the determined range. The hint generator 680 may provide at least one hint visually through a display and/or audibly through a speaker. The hint generator 680 may provide a hint through the user interface 690. For example, an operation of determining a range of a hint will be described referring to FIGS. 9A, 9B, 9C, 9D and 10 below.

According to an embodiment of the disclosure, the user interface 690 may include the various user interfaces 690 provided by the application 610. For example, the user interface 690 may include a hint. For example, the hint may be included in at least part of the user interface 690 corresponding to a function of the application 610 being executed.

According to an embodiment of the disclosure, at least part of configurations of the log analysis & level determination unit 601 and the hint provision & profile management unit 605 (e.g., the feature level manager 630, the user log analytics 640, the hint usage analyzer 650, the profile manager 660, the context monitor 670, the hint generator 680, and/or the user interface 690) may be included in a processor (e.g., the processor 120 of FIG. 1, the processor 220 of FIG. 2, or the processor 530 of FIG. 5). At least part of operations of configurations of the log analysis & level determination unit 601 and the hint provision & profile management unit 605 may be performed by a processor of an electronic device.

According to an embodiment of the disclosure, the electronic device may recognize a level of a function being employed by the user, based on structure information obtained by structurally and hierarchically analyzing a usage pattern (e.g., a usage pattern of the application 610) of the electronic device of the user, and then may provide a hint by determining a range of functions likely to be employed by the user. Accordingly, the electronic device may provide the hint suitable for a usage situation of the electronic device of the user. Furthermore, the electronic device may provide the hint optimized for each user by dynamically determining the range of the hint personalized for each user based on the user's recommendation command usage history.

Figure 7:
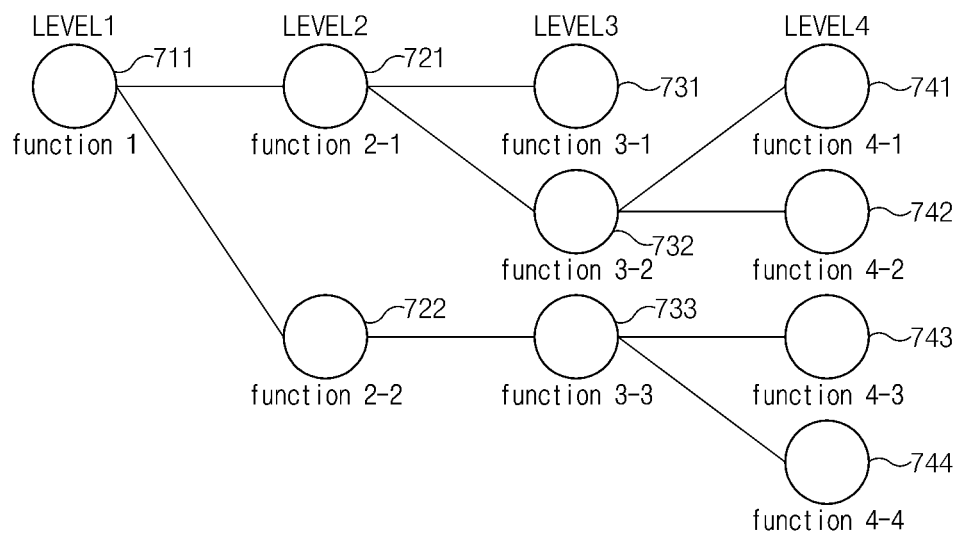
FIG. 7 is a diagram for describing structure information obtained by classifying functions executable in an application depending on levels, according to an embodiment of the disclosure.

FIG. 7 is a diagram for describing structure information obtained by classifying functions executable in an application depending on levels, according to an embodiment of the disclosure. For example, structure information may be information in a form of a graph obtained by classifying functions executable in an application in a hierarchical structure. For example, in the structure information, each of functions 711, 721, 722, 731, 732, 733, 741, 742, 743, and 744 of an application is displayed in a circle shape. The functions 711, 721, 722, 731, 732, 733, 741, 742, 743, and 744 may have a shape connected by using a solid line depending on an association (the degree of association) between the functions 711, 721, 722, 731, 732, 733, 741, 742, 743, and 744.

For example, referring to FIG. 7, when the application has the 10 functions 711, 721, 722, 731, 732, 733, 741, 742, 743, and 744, the structure information may have a tree structure between the functions 711, 721, 722, 731, 732, 733, 741, 742, 743, and 744 based on the association or relationship between the 10 functions 711, 721, 722, 731, 732, 733, 741, 742, 743, and 744. For example, the electronic device may determine a level of each of the functions 711, 721, 722, 731, 732, 733, 741, 742, 743, and 744 of the application and may generate the structure information based on the determined level. The level of each of the functions may be determined based on an entry stage of the functions 711, 721, 722, 731, 732, 733, 741, 742, 743, and 744 in the application. For example, the entry stage may mean an entry stage of a user interface provided by the application. For example, an electronic device (e.g., the electronic device 101 of FIG. 1, the user terminal 201 of FIGS. 2 to 4, the electronic device 500 of FIG. 5, or the electronic device 600 of FIG. 6) may generate the structure information based on the structure of the user interface corresponding to each of the functions 711, 721, 722, 731, 732, 733, 741, 742, 743, and 744 of the application. As another example, when the application includes pre-specified structure information, the electronic device may obtain the structure information of the corresponding application from the application.

For example, referring to FIG. 7, the first function (function 1) 711 of the application is set to level 1; the second function (function 2-1) 721 and the third function (function 2-2) 722 of the application are set to level 2; the fourth function (function 3-1) 731, the fifth function (function 3-2) 732, and the sixth function (function 3-3) 733 of the application are set to level 3; and, the seventh function (function 4-1) 741, the eighth function (function 4-2) 742, the ninth function (function 4-3) 743, and the tenth function (function 4-4) 744 of the application are set to level 4.

For example, assuming that a calendar application is launched, when the first function 711 is an 'open calendar' function, an 'add new schedule' function, which is related to the first function 711 and is capable of being entered (executed) following the first function 711, may correspond to the second function 721, and a 'scan schedule' function may correspond to the third function 722. For example, when the second function 721 is the 'add new schedule' function, a 'set schedule place' function that is related to the second function 721 and is capable of being entered (executed) following the second function 721 may correspond to the fourth function 731; a 'set schedule reminder' function may correspond to the fifth function 732; and, a 'set schedule guest' function may correspond to the sixth function. For example, when the fifth function 732 is the 'set schedule reminder' function, a 'set schedule reminder repeat' function that is related to the fifth function 732 and is capable of being opened (executed) following the fifth function 732 may correspond to the seventh function 741. The description of the calendar application and a function thereof is an example, and is not limited thereto.

According to an embodiment of the disclosure, the electronic device may recognize a location (e.g., a level), which corresponds to a function of an application executed by the user or a function of an application currently running in the structure information, based on the structure information of the application and may determine a range of a recommendation command (or a hint) to be provided to the user based on the recognized result.

Figure 8:
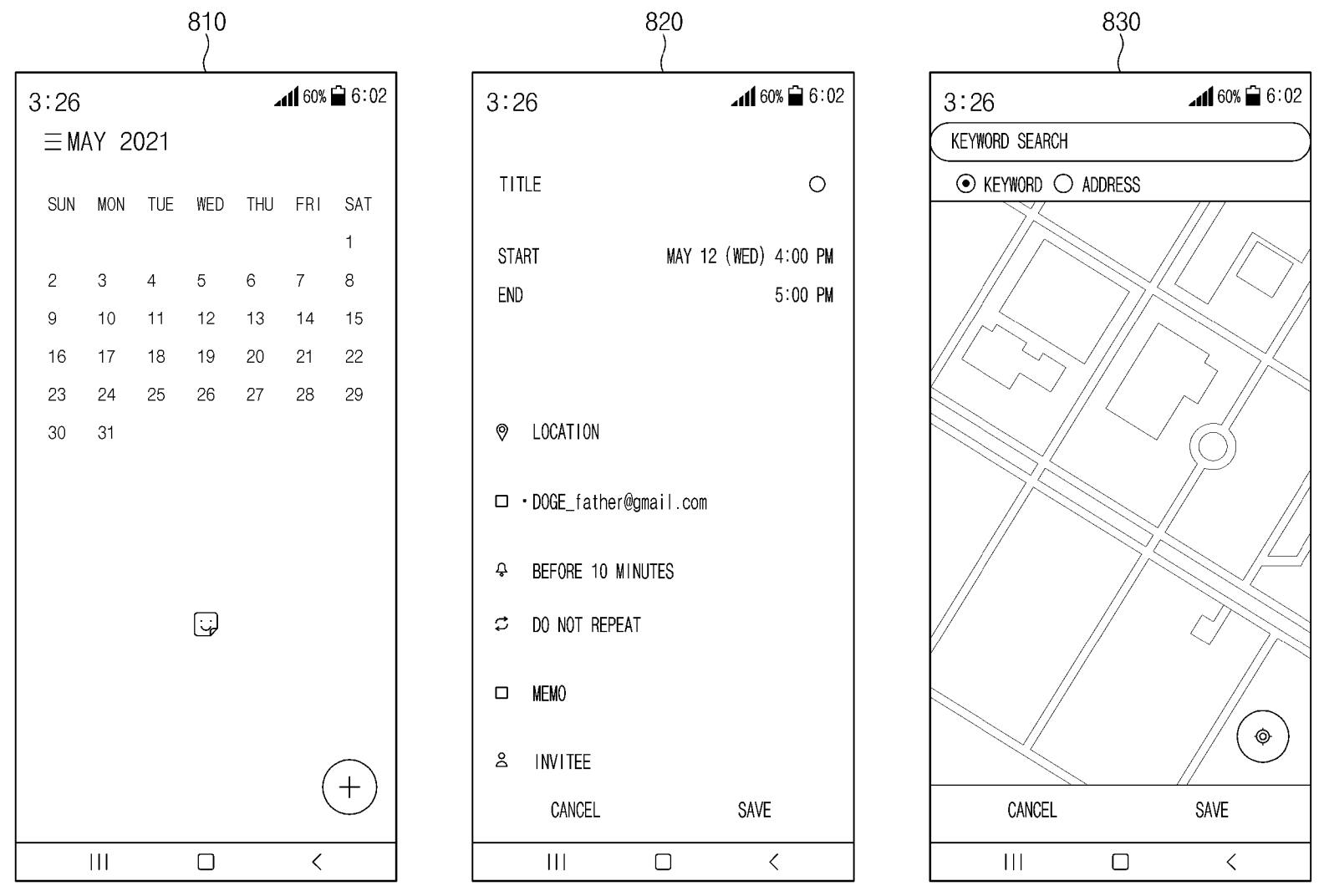

FIG. 8 is a diagram for describing an operation of an electronic device, according to an embodiment of the disclosure.

According to an embodiment of the disclosure, an electronic device (e.g., the electronic device 101 of FIG. 1, the user terminal 201 of FIGS. 2 to 4, the electronic device 500 of FIG. 5, or the electronic device 600 of FIG. 6) may generate structure information of an application based on a structure and/or entry path of the user interface (UI) related to the application.

For example, referring to FIG. 8, it illustrates a first UI 810, a second UI 820, and a third UI 830 of a calendar application. The first UI 810 is a user interface when the calendar application is opened, the second UI 820 is a user interface for a function to add a schedule; and, the third UI 830 is a user interface for a function to add a schedule place. For example, when the calendar application is used, the first UI 810 corresponding to a first open_calendar function may be provided; the second UI 820 for adding a schedule depending on a user input may be provided; and, after adding the schedule depending on a user's additional input, the third UI 830 for adding a schedule place may be sequentially provided as detailed information of the schedule. In this case, an entry path of the application may be in the order of the first UI 810, the second UI 820, and the third UI 830.

Depending on the entry path, the electronic device may determine a level of an open_calendar function corresponding to the first UI 810 as level 1, may determine a level of a set_schedule function corresponding to the second UI 820 as level 2, and may determine a level of a set_schedule place function corresponding to the third UI 830 as level 3. The electronic device may generate structure information of a calendar application based on the determined level of each of the functions. For example, the structure information may include hierarchical information (or level) of each of the functions and/or information indicating an association. For example, the structure information generated by the electronic device may include structure information in a form of a graph as illustrated in FIG. 7.

FIGS. 9A, 9B, 9C, and 9D are diagrams illustrating an operation of an electronic device, according to various embodiments of the disclosure. Referring to FIGS. 9A, 9B, 9C, and 9D, it is assumed that functions of a first application 901 corresponding to a first function (function 1) 911, a second function (function 2-1) 921, a third function (function 2-2) 922, a fourth function (function 3-1) 931, a fifth function (function 3-2) 932, a sixth function (function 3-3) 933, a seventh function (function 4-1) 941, an eighth function (function 4-2) 942, a ninth function (function 4-3) 943, and a tenth function (function 4-4) 944. It is assumed that structure information has a form of a graph, but is not limited thereto.

Figure 9A:
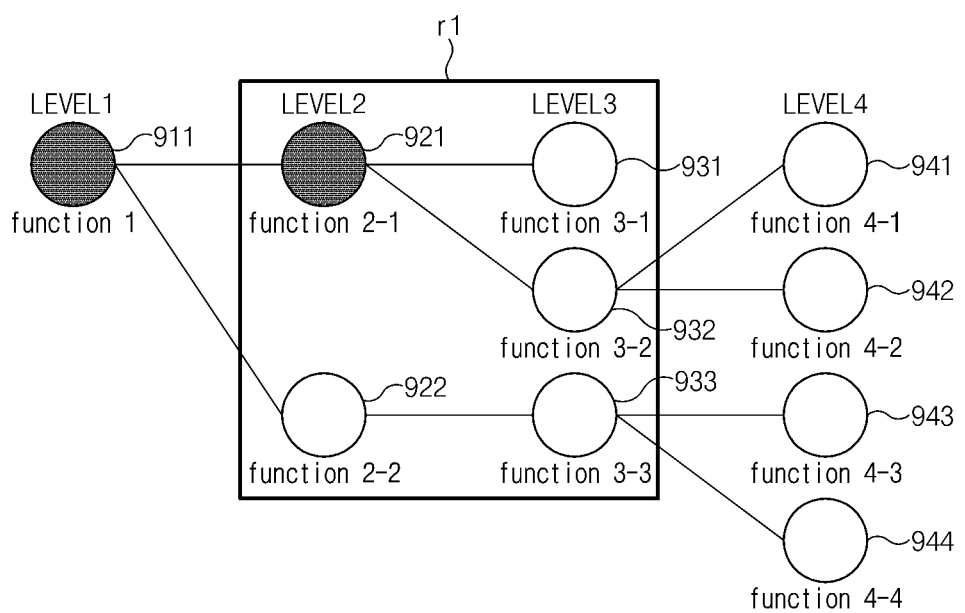
FIGS. 9A, 9B, 9C, and 9D are diagrams for describing an operation of an electronic device, according to various embodiments of the disclosure.

For example, referring to FIG. 9A, it illustrates that an electronic device (e.g., the electronic device 101 of FIG. 1, the user terminal 201 of FIGS. 2 to 4, the electronic device 500 of FIG. 5, or the electronic device 600 of FIG. 6) determines a range of a recommendation command when performing the first function 911 and the second function 921 of the first application. The electronic device may perform the first function 911 of the first application depending on a user's input, and then may be executing the second function 921. The electronic device may recognize that a function of the first application currently being executed is the second function 921, based on the structure information. The electronic device may determine a range of functions of the first application, which the user is expected to employ after a function currently running, to be in a range of a recommendation command based on the structure information. For example, the electronic device may determine the third function 922 of level 2, which is the same as the second function 921 thus currently running, the fourth function 931, the fifth function 932, and the sixth function 933 of level 3 adjacent to the level of the second function 921 thus currently running, to be in the range of the recommendation command based on a level of each of the functions. Because functions (the seventh function 941, the eighth function 942, the ninth function 943, and the tenth function 944) of level 4 does not have an association with the second function 921 thus currently running and do not correspond to a function of a level adjacent to the second function 921 when determining the functions based on the structure information, the electronic device may exclude functions of level 4 from a range of a recommendation command.

Figure 9B:
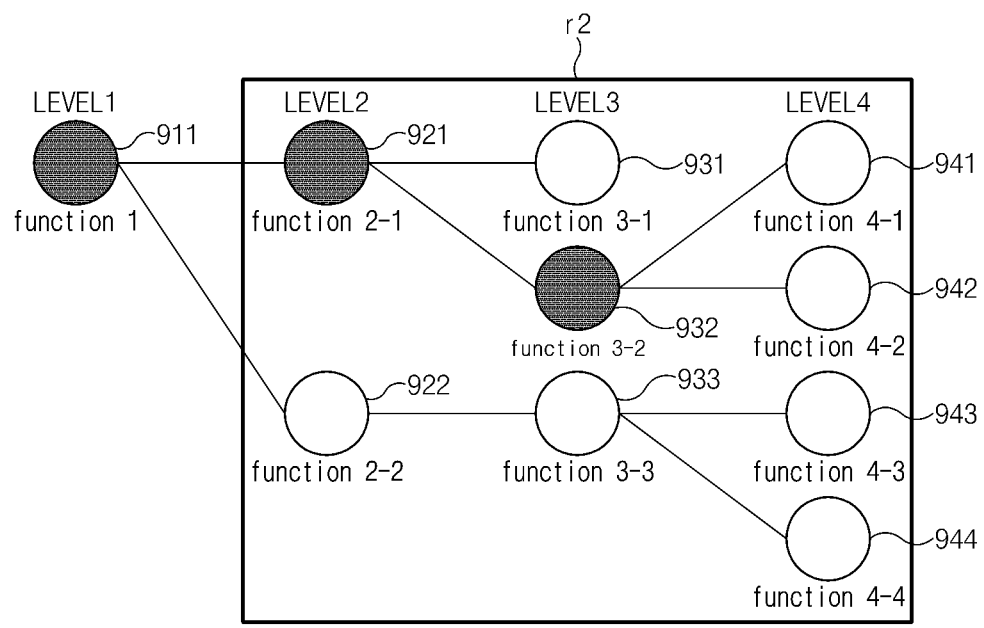

For example, referring to FIG. 9B, it illustrates that an electronic device determines a range of a recommendation command when performing the first function 911, the second function 921, and the fifth function 932 of the first application. The electronic device may recognize that a function of the first application currently being executed is the fifth function 932, based on the structure information. The electronic device may determine a range of functions of the first application, which the user is expected to employ after a function currently running, to be in a range of a recommendation command based on the structure information. For example, the electronic device may determine functions within a distance (i.e., within a specified range), which are adjacent to a function thus currently running in the structure information to be in the range of the recommendation command. For example, the electronic device may determine the fourth function 931 and the sixth function 933 of level 3 the same as the fifth function 932 currently being executed, the second function 921 and the third function 922 of level 2 adjacent to the fifth function 932 currently being executed, and the seventh function 941, the eighth function 942, the ninth function 943, and the tenth function 944 of level 3 adjacent to the fifth function 932 currently being executed, to be in the range of the recommendation command based on the level of each of the functions.

Figure 9C:
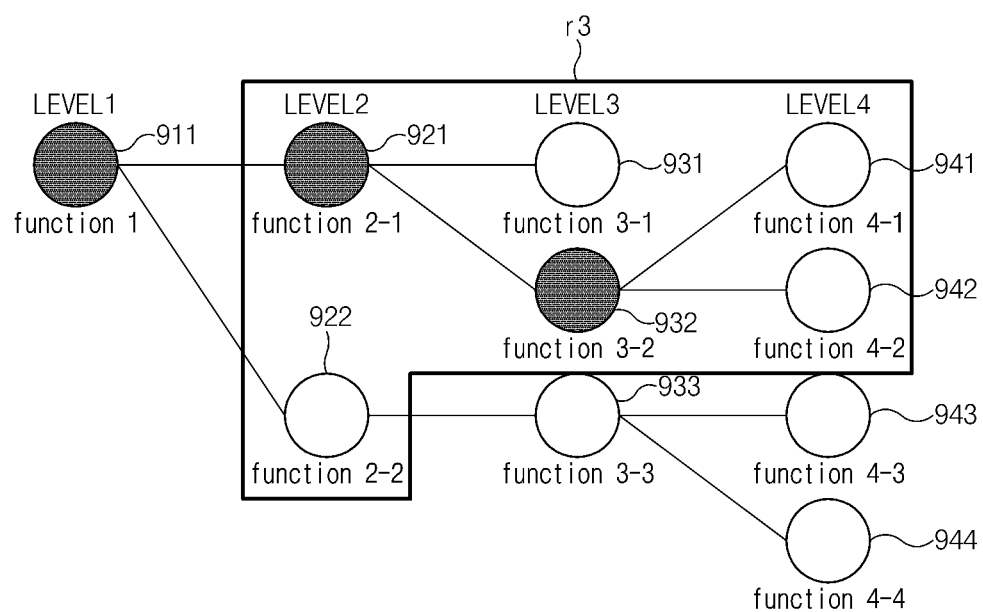

For example, referring to FIG. 9C, it illustrates that an electronic device determines a range of a recommendation command when performing the first function 911, the second function 921, and the fifth function 932 of the first application. The electronic device may recognize that a function of the first application currently being executed is the fifth function 932, based on the structure information. The electronic device may determine a range of functions of the first application, which the user is expected to employ after a function currently running, to be in a range of a recommendation command based on the structure information. For example, the electronic device may determine functions within a distance (i.e., within a specified range) adjacent to the function thus currently running in the structure information to be in the range of the recommendation command based on a UI conjunction relation between the functions. For example, the UI conjunction relation may be determined based on a path for entering UIs corresponding to functions to perform each of the functions. For example, the UI conjunction relation may mean an association between the functions. For example, the sixth function 933 may have the same level as the fifth function 932 currently running. However, to execute the sixth function 933, the third function 922 may need to be executed first. For example, the UI corresponding to the sixth function 933 may be capable of being entered through a UI corresponding to the third function 922. The electronic device may determine the fourth function 931 of level 3 the same as the fifth function 932 currently running, the second function 921 and the third function 922 of level 2, which have the UI conjunction relation with each other, from among functions of level 2 adjacent to the fifth function 932 currently running, and the seventh function 941 and the eighth function 942, which have the UI conjunction relation with each other, from among functions of level 4 adjacent to the fifth function 932 currently running to be in the range of a recommendation command based on a level of each of the functions and the UI conjunction relation.

Figure 9D:
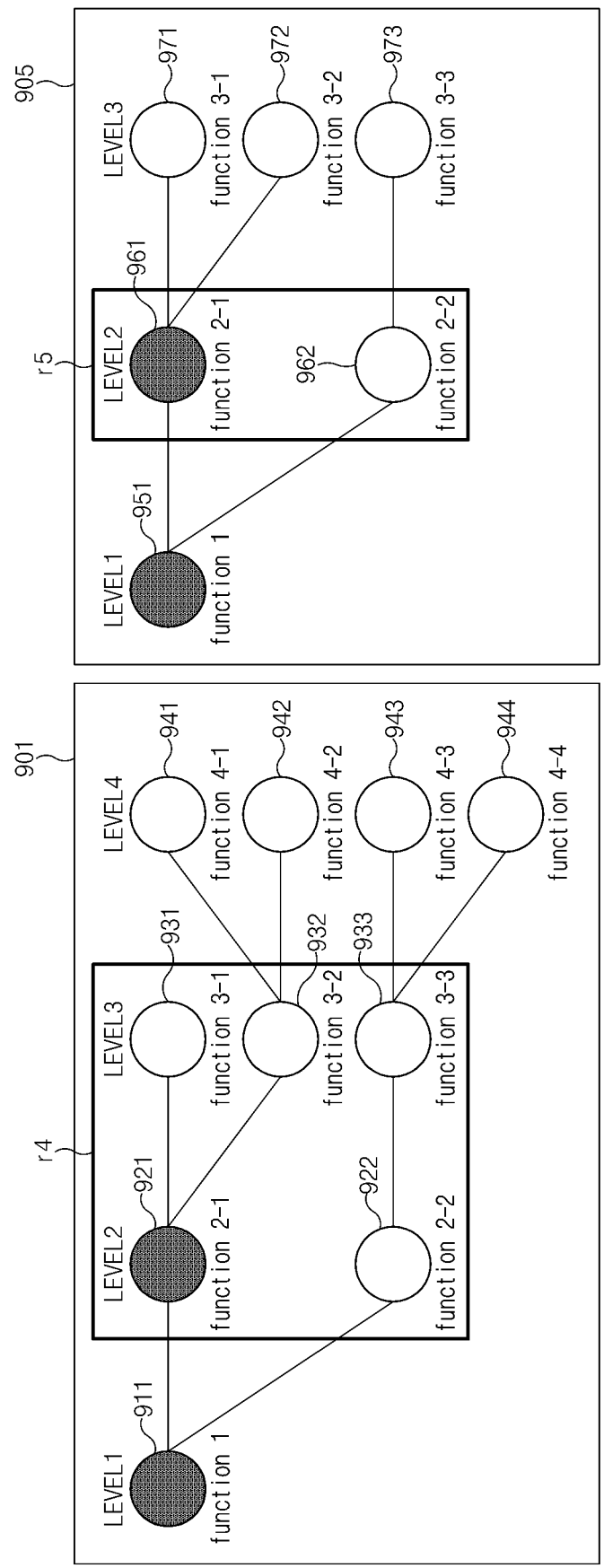

For example, referring to FIG. 9D, it illustrates that an electronic device determines a range of a recommendation command when performing the first function 911 and the second function 921 of an application. Referring to FIGS. 9A, 9B, 9C, and 9D, it is assumed that functions 905 of a first application corresponding to an eleventh function (function 11) 951, a twelfth function (function 12-1) 961, a thirteenth function (function 12-2) 962, a fourteenth function (function 13-1) 971, a fifteenth function (function 13-2) 972, and a sixteenth function (function 13-3) 973, but is not limited thereto. For example, when determining the range of the recommendation command, the electronic device may also determine functions of another application (e.g., the second application), in addition to functions of an application (e.g., the first application) currently running, to be in the range of the recommendation command. The electronic device may provide a recommendation command (or hint) related to a domain different from a current domain as well as a recommendation command related to the current domain. For example, an association between functions may be defined between different applications. For example, the association between functions may be determined based on a structure, an entry path, and/or an association relation (correlation) of an UI corresponding to each of the functions, or may be determined based on a value pre-specified in an application. According to an embodiment of the disclosure, the electronic device may determine the range of a recommendation command based at least partly on the user's application usage history. For example, when a history in which the user employs the twelfth function 961 or the thirteenth function 962 of the second application after employing the second function 921 of the first application is repeated the specified number of times or more, the electronic device may recognize the second function 921 and the twelfth function 961 and/or the thirteenth function 962 as functions having a high association with each other. For example, the electronic device may determine the third function 922 of level 2, which is the same as the second function 921 thus currently running, the fourth function 931, the fifth function 932, and the sixth function 933 of level 3 adjacent to the level of the second function 921 thus currently running, and the twelfth function 961 and the thirteenth function 962 of the second application, which have a high association with the second function 921 thus currently running, to be in the range of the recommendation command.

According to an embodiment of the disclosure, the electronic device may generate a recommendation command corresponding to at least one function belonging to the determined range of a recommendation command and may provide the generated recommendation command to the user. The electronic device may dynamically determine a range of the recommendation command based on the structure information and/or the user's application usage history and may provide the recommendation command by using the range of the recommendation command, thereby efficiently providing the recommendation command corresponding to a function suitable and available for each user.

Figure 10:
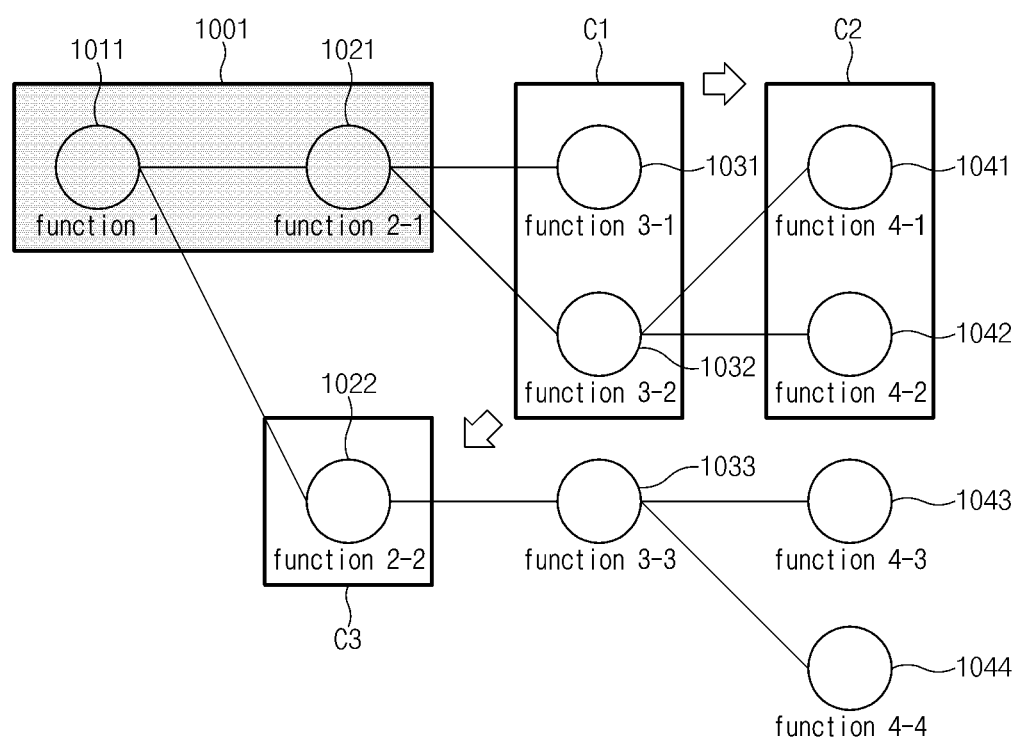
FIG. 10 is a diagram for describing an operation of an electronic device, according to an embodiment of the disclosure.

FIG. 10 is a diagram for describing an operation of an electronic device, according to an embodiment of the disclosure.

Referring to FIG. 10, it is assumed that functions 1001 of a first application corresponding to a first function (function 1) 1011, a second function (function 2-1) 1021, a third function (function 2-2) 1022, a fourth function (function 3-1) 1031, a fifth function (function 3-2) 1032, a sixth function (function 3-3) 1033, a seventh function (function 4-1) 1041, an eighth function (function 4-2) 1042, a ninth function (function 4-3) 1043, and a tenth function (function 4-4) 1044. It is assumed that structure information has a form of a graph, but is not limited thereto. For example, FIG. 10 illustrates that an electronic device (e.g., the electronic device 101 of FIG. 1, the user terminal 201 of FIGS. 2 to 4, the electronic device 500 of FIG. 5, or the electronic device 600 of FIG. 6) determines a range of a recommendation command when performing the first function 1011 and the second function 1021 of an application.

According to an embodiment of the disclosure, the electronic device may determine a range of a recommendation command based at least partly on a user's recommendation command usage history. For example, the electronic device may determine the range of recommendation commands based on whether the user has employed a recommendation command thus previously provided (i.e., whether a function corresponding to a recommendation command has been used), the recommendation command used frequently by the user, the preference of the user's recommendation command, and/or the tendency of the recommendation command selected by the user from among a plurality of recommendation commands. For example, when it is determined, based on the structure information and the user's recommendation command usage history, that the user's recommendation command usage frequency is greater than or equal to a specified value, the electronic device may determine that a function having a level higher than that of a function currently running is in a range of a recommendation command. When it is determined, based on the structure information and the user's recommendation command usage history, that the user's recommendation command usage frequency is less than the specified value, the electronic device may determine that a function having a level lower than that of the function currently running in the range of the recommendation command. For example, based on the structure information and the user's recommendation command usage history, the electronic device may determine whether the user has previously preferred a horizontal recommendation command (e.g., a recommendation command corresponding to a function having a level less than or equal to a level of the function being executed), or whether the user has previously preferred a vertical recommendation command (e.g., a recommendation command corresponding to a function having a level higher than the level of the function being executed). The electronic device may determine the range of the recommendation command based on the user's determined recommendation command preference.

For example, the electronic device may determine that the fourth function 1031 and the fifth function 1032 adjacent to the second function 1021 currently running are within the range of the recommendation command. For example, when determining that the user prefers the horizontal recommendation command, based on the user's recommendation command usage history, the electronic device may add the third function 1022 to the range of the recommendation command. For example, the fact that the user prefers the horizontal recommendation command may mean that the user is relatively passive in using the recommendation command, or the user frequently employs basic functions of an application. In this case, the electronic device may determine that the relatively low-level functions (e.g., the third function 1022) corresponding to the basic functions of the application are within the range of the recommendation command. As another example, when determining that the user prefers the vertical recommendation command, based on the user's recommendation command usage history, the electronic device may add the seventh function 1041 and/or the eighth function 1042 to the range of the recommendation command. For example, the fact that the user prefers the vertical recommendation command may mean that the user is relatively active in using the recommendation command. In this case, the electronic device may determine that the relatively high-level functions (e.g., the seventh function 1041 and/or the eighth function 1042) corresponding to advanced functions of the application are within the range of the recommendation command.

According to an embodiment of the disclosure, the electronic device may recognize the user's tendency or preference based on the user's recommendation command usage history and may determine the range of a recommendation command based on the recognized result, thereby providing a suitable recommendation command to the user.

FIGS. 11A to 11D are examples of a user interface for providing a recommendation command of an electronic device, according to various embodiments of the disclosure.

Figure 11A:
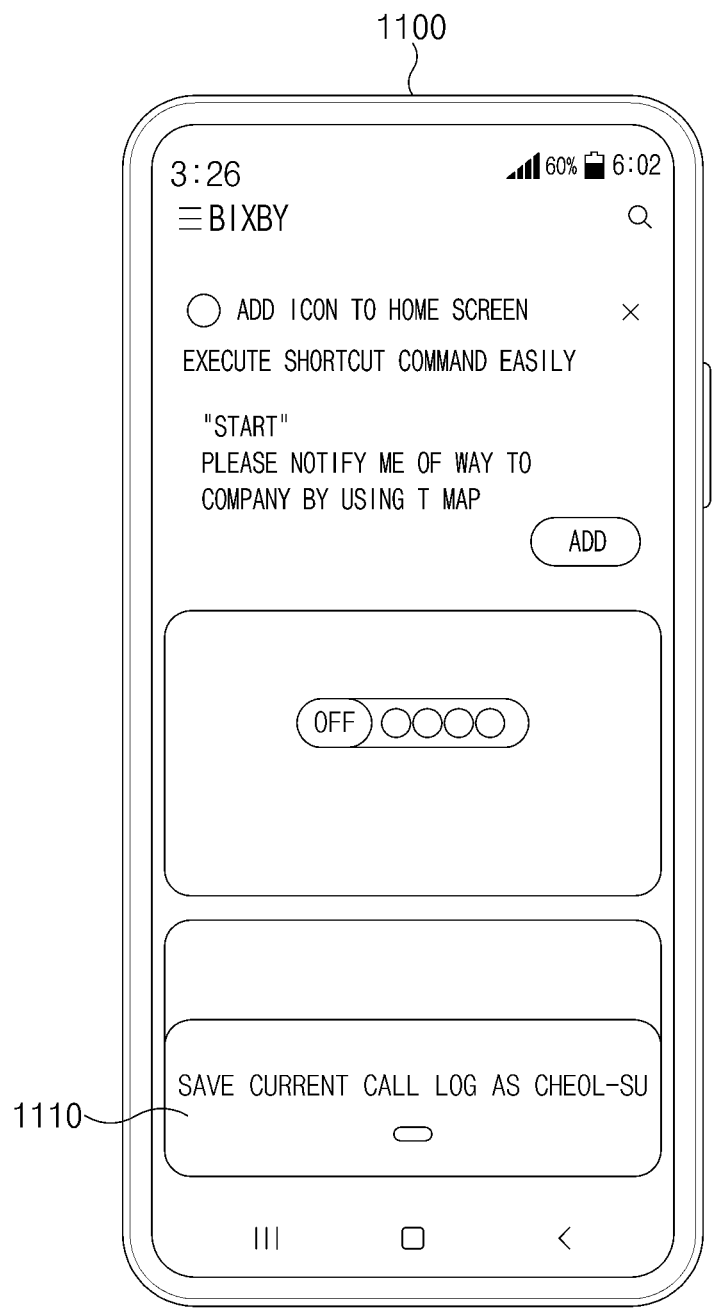
FIGS. 11A, 11B, 11C, and 11D are examples of a user interface for providing a recommendation command of an electronic device, according to various embodiments of the disclosure.

Referring to FIG. 11A, it illustrates a user interface corresponding to a function currently being performed by an electronic device 1100. For example, when a user makes an utterance of "save a current call log as Cheol-su", an electronic device 1100 may display a user interface 1110 including information (i.e., information corresponding to a function to be executed) corresponding to a user's utterance, and may perform the corresponding function. For example, FIG. 11A illustrates that the electronic device 1100 performs a call record storage function related to a call application.

Figure 11B:
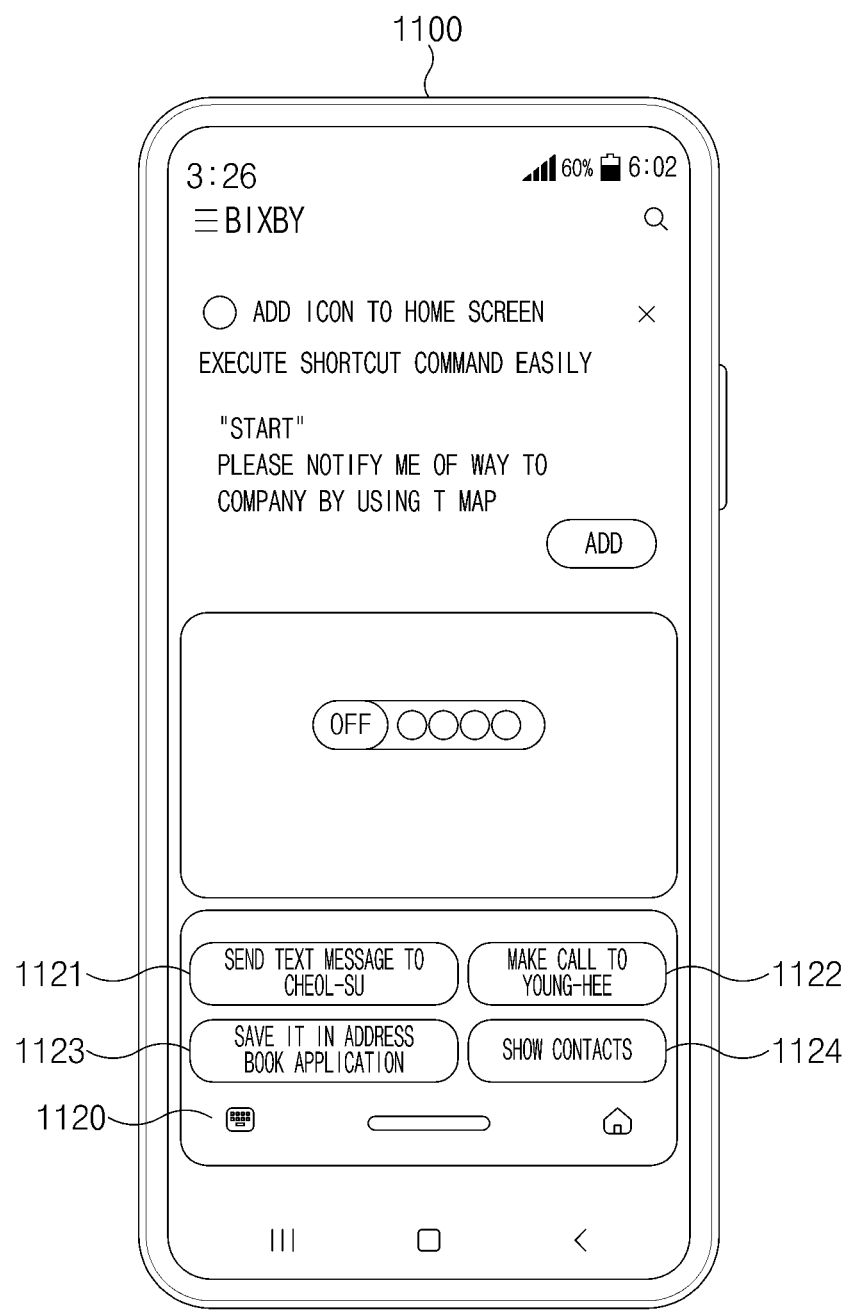

Referring to FIG. 11B, it illustrates that the electronic device 1100 provides an interface with a user interface 1120 including a recommendation command after performing the function illustrated in FIG. 11A. For example, a time point at which the user interface 1120 including a recommendation command is provided may include at least one of a time point at which an application or another application is executed, a time point at which a specified function of the application is executed, a time point at which the electronic device 1100 is positioned at a specified location, a specified time (a time point), a time point at which a user input is received, a time point at which a specific context condition is satisfied, or a time point at which the electronic device 1100 uses an assistant function.

For example, the electronic device 1100 may recognize a level of a function (saving a call log to contacts) of a call application currently running based on the structure information obtained by classifying functions of a call application depending on levels, and may determine that a function having high relevance within a range of a recommended command to be provided to the user, based on the recognized level. For example, the electronic device 1100 may determine that a 'text message sending function', a 'call sending function', a 'function to save a call log in an address book application (hereinafter, it is used interchangeably with term 'App')', and a 'contact search function' are within the range of the recommendation command. The electronic device 1100 may provide a recommendation command 1121 of "send a text message to Cheol-su" corresponding to a 'text message sending function' that is highly related to a 'function to save the call log in contacts' by using a parameter (e.g., a person's name (Cheol-su)) used in a function thus previously performed. The electronic device 1100 may provide a recommendation command 1122 of "make a call to Young-hee" corresponding to a 'call sending function' that is highly related to a 'function to save the call log in contacts' by using another parameter (e.g., a person's name (Young-hee)) related to the parameter (e.g., a person's name (Cheol-su)) used in a function thus previously performed. The electronic device 1100 may provide a recommendation command 1123 of "save it in the address book app" corresponding to a 'save it in an address book application' function' that is highly related to a 'function to save a call log in contacts'. The electronic device 1100 may provide a recommendation command 1124 of "show contacts" corresponding to a 'scan contact function' that is highly related to a 'function to save the call log in contacts'. For example, the electronic device may provide the recommendation commands 1122 and 1124 corresponding to a function (e.g., a call sending function or a contact search function) of the same domain (e.g., a call application) as a function (e.g., a function to save a call log to contacts) of a call application currently running. Alternatively, the electronic device may provide the recommendation commands 1121 and 1123 corresponding to a function in a domain (e.g., a text application or an address book application) different from a function (e.g., a function to save a call log to contacts) of a call application currently running.

According to an embodiment of the disclosure, when the electronic device 1100 provides the plurality of recommendation commands 1121, 1122, 1123, and 1124, the electronic device 1100 may determine the order or format of providing recommendation commands based on the importance of a recommendation command (a function corresponding to the recommendation command), the user's preference, or the set priority. For example, the electronic device 1100 may provide a recommendation command corresponding to a function that is frequently employed by the user, or may sort and provide a plurality of recommendation commands in the order of a frequency at which the user employs a recommendation command.

Figure 11C:
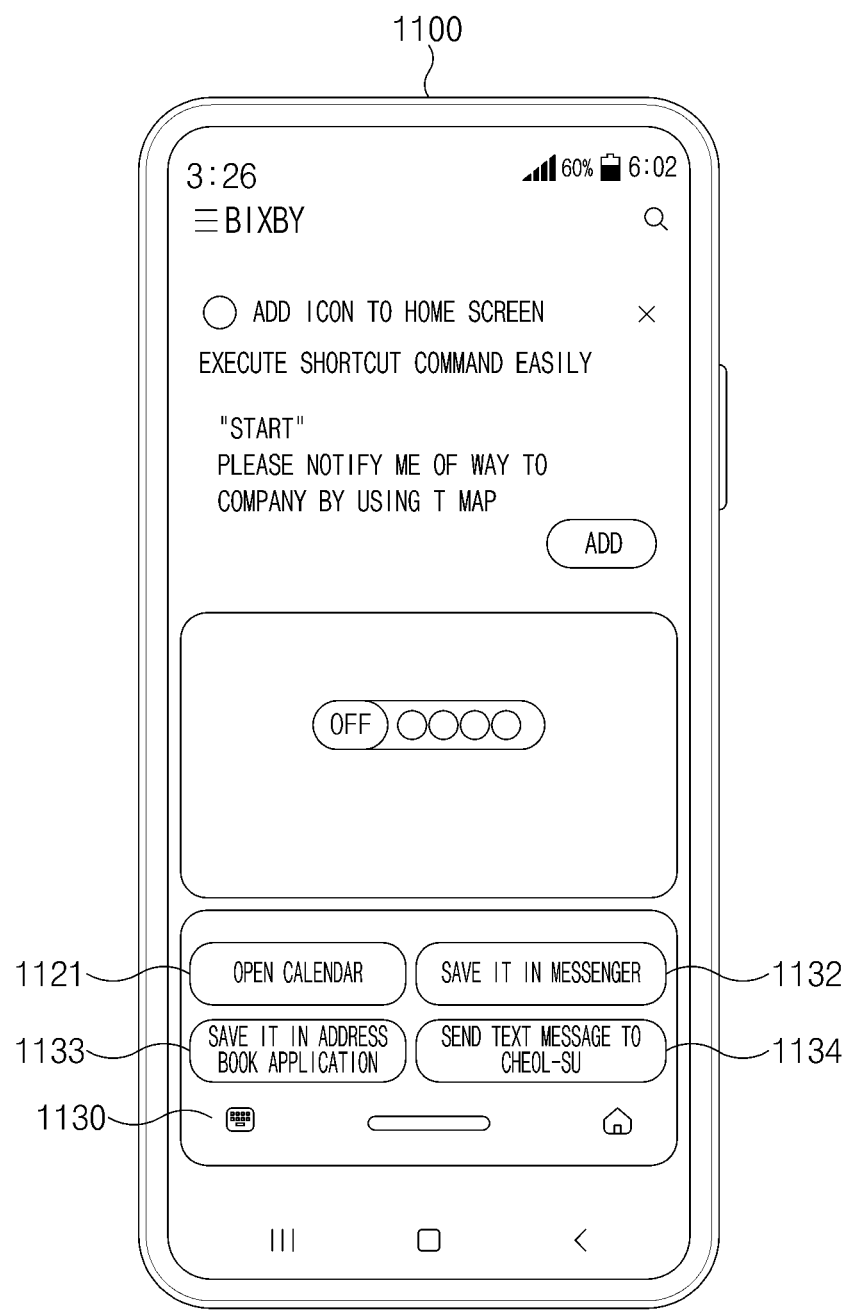

Referring to FIG. 11C, it illustrates that the electronic device 1100 provides an interface with a user interface 1130 including a recommendation command after performing the function illustrated in FIG. 11A. According to an embodiment of the disclosure, in addition to a function of an application (a current domain) (e.g., a currency application) currently being used, the electronic device 1100 may provide a recommendation command corresponding to a function of another application (a different domain) (e.g., a calendar application, a messenger application, an address book application, and/or a text application). For example, the electronic device 1100 may include a function of an application, which is different from a function previously performed, or a function of a different domain in the range of the recommendation command based on a user's application usage history and/or a user profile. The electronic device 1100 may determine an association between applications (between domains) based on the user's application usage history and/or the user profile. For example, the electronic device 1100 may determine an association between applications (between domains) based on a history, in which the user has successively employed applications, and/or may determine an association between applications (between domains) based on association information (e.g., information of the associated application and/or function) pre-stored in an application. For example, even though the function of the different application (different domain) is provided as a recommendation command, the electronic device 1100 may determine a range of a recommendation command based on structure information obtained by hierarchically classifying functions of each application. For example, the electronic device 1100 may determine levels of functions of the first application and/or levels of functions of the second application, which are to be used as a recommendation command, based on a level of a function performed in the first application and may determine the range of the recommendation command based on the determined level. For example, a function (a function to save a call log to contacts of FIG. 11A) performed by the electronic device

1100 may be a function of a call application, and may provide functions of a calendar application, a messenger application, an address book application, and a text application, which are different from the call application, as recommendation commands. With regard to the function to save a call log to contacts, the electronic device 1100 may provide a user interface 1130 including a recommendation command of "open calendar" 1131 corresponding to a 'calendar opening (executing) function' of the calendar application, "save it in a messenger" 1132 corresponding to the 'contact saving function' of the messenger application, "save it in an address book app" 1133 corresponding to the 'address book saving function' of the address book application, and "send a text to Cheol-su" 1134 corresponding to the 'text message sending function' of the text application.

Figure 11D:
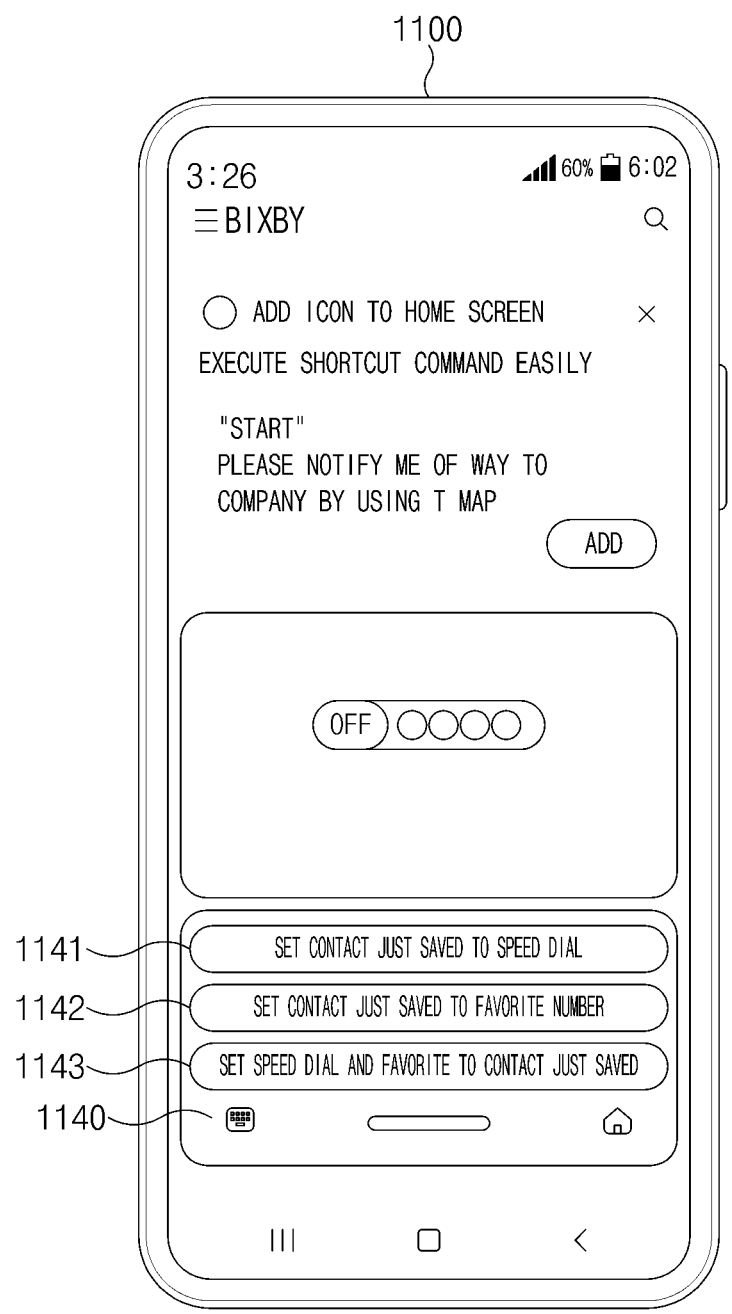

Referring to FIG. 11D, it illustrates that the electronic device 1100 provides an interface with a user interface 1140 including a recommendation command after performing the function illustrated in FIG. 11A. According to an embodiment of the disclosure, the electronic device 1100 may determine the range of recommendation commands based on a user's recommendation command usage history and/or a user profile and may provide at least one recommendation command based on the determined range. For example, when it is determined that the user's recommendation command usage frequency is greater than or equal to a specified value, the electronic device 1100 may determine that a function having a level higher than that of a function currently running is in a range of a recommendation command. When it is determined that the user's recommendation command usage frequency is less than the specified value, the electronic device 1100 may determine that a function having a level lower than that of the function currently running in the range of the recommendation command. For example, based on the structure information and the user's recommendation command usage history, the electronic device 1100 may determine whether the user has previously preferred a horizontal recommendation command (e.g., a recommendation command corresponding to a function having a level less than or equal to a level of the function being executed), or whether the user has previously preferred a vertical recommendation command (e.g., a recommendation command corresponding to a function having a level higher than the level of the function being executed). The electronic device 1100 may determine the range of the recommendation command based on the user's determined recommendation command preference. Based on a recommendation command usage history, the electronic device 1100 may provide a recommendation command (i.e., a recommendation command that corresponds to an advanced function) corresponding to a function of a relatively high level or may provide a recommendation command (i.e., a recommendation command corresponding to a default function) corresponding to a function of a relatively low level. For example, FIG. 11D is an example of a recommendation command provided by the electronic device 1100 when a usage frequency of the user's recommendation command is greater than or equal to a specified value, and it is determined that the user prefers a vertical recommendation command. For example, after the electronic device 1100 performs a 'function to save the call log to the contact' (e.g., save a phone number corresponding to a call log as 'Cheol-su' in contacts), the electronic device 1100 may provide a recommendation commands of "set a contact just saved to a speed dial" 1141 (or "set a speed dial for Cheol-su") and "set a contact just saved to a favorite number" 1142 (or "set a favorite for Cheol-su"). As another example, when the usage frequency of the user's recommendation command is less than the specified value or it is determined that the user prefers a horizontal recommendation command, the electronic device 1100 may provide a recommendation command (e.g., "make a call to Cheol-su") corresponding to a default function (a lower level function) (e.g., a call sending function) of an application as in FIG. 11B. According to an embodiment of the disclosure, the electronic device may provide a recommendation command corresponding to a plurality of functions. For example, when the usage frequency of the user's recommendation command is greater than or equal to the specified value, or it is determined that the user prefers the vertical recommendation command, the electronic device may provide a recommendation command of "set a speed dial and favorite to a contact just saved" 1143 corresponding to a speed dial setting function and a favorite setting function. FIG. 11D illustrates only the recommendation command 1143 corresponding to the combination of vertical functions, but is not limited thereto. For example, the electronic device may provide a recommendation command (e.g., "send a text message to Cheol-su and make a call to Young-hee") corresponding to a combination of horizontal functions or a recommendation command (e.g., "set a speed dial for Cheol-su and make a call to Cheol-su") corresponding to a combination of vertical and horizontal functions based on the usage frequency of the user's recommendation command or the preference of the user's recommendation command.

FIGS. 11A, 11B, 11C, and 11D and related descriptions relate to examples in which the electronic device 1100 according to an embodiment of the disclosure provides a recommendation command. An application executed by the electronic device 1100, a function of the application, or the provided recommendation command is not limited thereto.

According to an embodiment of the disclosure, an electronic device may include a display, a memory, and at least one processor operatively connected to the display and the memory. The memory may store instructions, when executed by the at least one processor, cause the processor to recognize a level of a function of an application currently running, based on structure information obtained by classifying functions executable in an application depending on levels, to determine a range of a recommendation command to be provided to a user based at least partly on the structure information and the recognized level, and to provide a user with at least one recommendation command based on the determined range.

According to an embodiment of the disclosure, the instructions may, when executed, cause the processor to determine the range of the recommendation command based at least partly on a profile of a user.

According to an embodiment of the disclosure, the instructions may, when executed, cause the processor to determine the profile of the user based on at least part of a usage history of the application of a user or a recommendation command usage history of a user.

According to an embodiment of the disclosure, the usage history of the application may include a history of functions, which are used in connection with each other, from among a function of the application and a function of another application.

According to an embodiment of the disclosure, the instructions may, when executed, cause the processor to determine a time point at which the recommendation command is to be provided, based on at least part of the structure information and the profile of the user.

According to an embodiment of the disclosure, the time point at which the recommendation command is to be provided may include at least one of a time point at which the application or another application is executed, a time point at which a specified function of the application is executed, a time point at which the electronic device is positioned at a specified location, at a specified time point, or a time point at which an assistant function is used in the electronic device.

According to an embodiment of the disclosure, the instructions may, when executed, cause the processor to obtain the structure information included in the application from the application.

According to an embodiment of the disclosure, the instructions may, when executed, cause the processor to generate the structure information of the application based on at least part of a structure or an entry path of a plurality of user interfaces (UIs) provided by the application.

According to an embodiment of the disclosure, the instructions may, when executed, cause the processor to determine an association between functions of the application based on at least one of the structure information, information included in a user interface corresponding to each function of the application, an association value between functions specified in the application, and a usage history of the application of a user, and to determine the range of the recommendation command based on the determined association.

According to an embodiment of the disclosure, the instructions may, when executed, cause the processor to determine the association between the functions for each user, and to store information of the determined association between the functions for each user in the memory.

According to an embodiment of the disclosure, the instructions may, when executed, cause the processor to determine the range of the recommendation command to include a recommendation command corresponding to a function having a level higher than the level of the recognized function when a recommendation command usage frequency of a user is greater than or equal to a specified value, and to determine the range of the recommendation command to include a recommendation command corresponding to a function having a level lower than or equal to the level of the recognized function when a recommendation command usage frequency of a user is less than a specified value.

According to an embodiment of the disclosure, the instructions may, when executed, cause the processor to determine a preference or a priority of a user for each of functions of the application based on a recommendation command usage history of a user, and to determine the range of the recommendation command based on the preference or the priority.

According to an embodiment of the disclosure, the instructions may, when executed, cause the processor to determine a method of providing the plurality of recommendation commands or an order for providing a plurality of recommendation commands based on the preference or the priority when providing a plurality of recommendation commands.

According to an embodiment of the disclosure, the instructions may, when executed, cause the processor to determine a degree of association between a function of the application thus running and a function of another application based on at least part of the structure information of the application and an application usage history of the user, and to include at least one of the function of the another application in the range of the recommendation command based on the determined degree of association.

Figure 12:
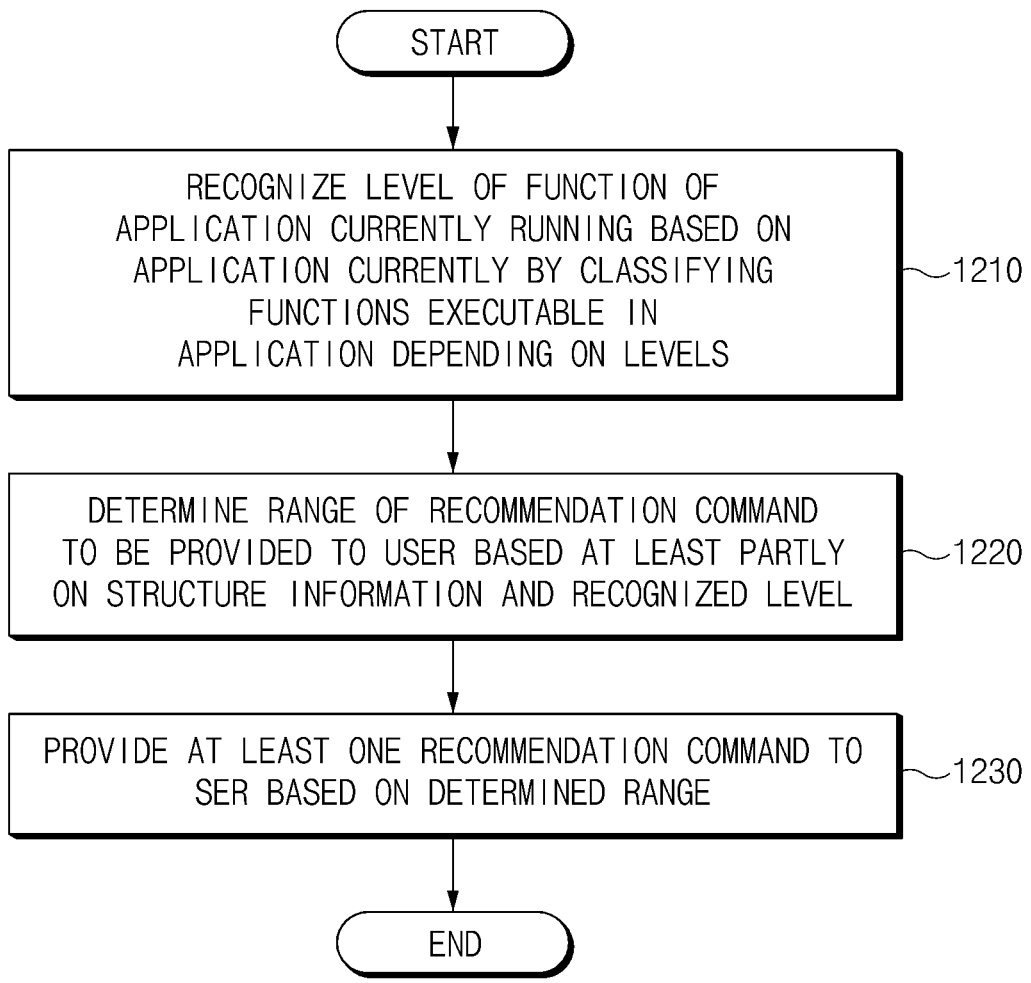
FIG. 12 is a flowchart of a method of operating an electronic device, according to an embodiment of the disclosure.

FIG. 12 is a flowchart of a method of operating an electronic device, according to an embodiment of the disclosure.

Referring to FIG. 12, according to an embodiment of the disclosure, in operation 1210, an electronic device (e.g., the electronic device 101 of FIG. 1, the user terminal 201 of FIGS. 2 to 4, the electronic device 500 of FIG. 5, or the electronic device 600 of FIG. 6) may recognize a level of a function of an application currently running, based on structure information obtained by classifying functions executable in the application depending on levels. According to an embodiment of the disclosure, the electronic device may generate the structure information based on an association (e.g., a user interface structure, an entry path, and/or a relevance corresponding to each function) between functions of the application or may obtain the structure information included in the application from the application. For example, the structure information may be in a form of a graph having functions of the application, and connection information between functions, but is not limited thereto.

According to an embodiment of the disclosure, in operation 1220, the electronic device may determine a range of a recommendation command to be provided to a user based at least partly on the structure information and the recognized level. For example, the electronic device may determine that functions corresponding to a level adjacent to the recognized level are within a range of the recommendation command, with reference to the structure information based on the recognized level. According to an embodiment of the disclosure, the electronic device may determine the range of the recommendation command based at least partly on the user's profile. For example, the electronic device may generate or update the user's profile based on at least part of the usage history of the user's application or the user's recommendation command usage history. For example, the usage history of the application may include the history of functions, which are used in connection with each other, from among a function of the application and a function of another application.

According to an embodiment of the disclosure, the electronic device may determine the association between functions of the application based on at least one of structure information, information included in a user interface corresponding to each function of the application, an association value between functions specified in the application, and a usage history of the user's application. For example, the electronic device may determine a range of a recommendation command based on the determined association between the functions. For example, the electronic device may determine the association between functions for each user and may store information of the determined association between functions for each user in a memory.

According to an embodiment of the disclosure, the electronic device may determine a range of a recommendation command based on a user's recommendation command usage history. For example, the electronic device may determine the user's preference or priority for each function of the application based on the user's recommendation command usage history. The electronic device may determine the range of the recommendation command based on the determined preference or priority. For example, when the user's recommendation command usage frequency is greater than or equal to a specified value, the electronic device may determine the range of the recommendation command to include a recommendation command corresponding to a function with a higher level than that of the function recognized in operation 1210. When the user's recommendation command usage frequency is less than the specified value, the electronic device may determine the range of the recommendation command to include a recommendation command corresponding to a function with a level that is not greater than that of the recognized function.

According to an embodiment of the disclosure, the electronic device may determine the degree of association between a function of the running application and a function of another application based on at least part of the structure information of the application and the user's application usage history. The electronic device may include at least one of functions of another application in the range of the recommendation command based on the determined degree of association. For example, in addition to the function of the currently running application (current domain), the electronic device may include functions of different applications (different domains) in the range of a recommendation command based on at least part of the structure information, the user's application usage history, or the recommendation command usage history.

According to an embodiment of the disclosure, in operation 1230, the electronic device may provide at least one recommendation command to the user based on the determined range. According to an embodiment of the disclosure, the electronic device may determine a method of providing at least one recommendation command or an order for providing recommendation commands based on the user's preference or priority for each of the functions of the application. For example, the electronic device may first provide a recommendation command having a high preference (priority) of the user or may sort and provide a plurality of recommendation commands in the order having the high preference. According to an embodiment of the disclosure, the electronic device may determine a time point at which a recommendation command is to be provided, based on at least part of the structure information and the user's profile. The time point at which a recommendation command is to be provided may include at least one of a time point at which an application or another application is executed, a time point at which a specified function of the application is executed, a time point at which the electronic device is positioned at a specified location, a specified time (a time point), a time point at which a user input is received, a time point at which a specified context condition is satisfied, or a time point at which the electronic device uses an assistant function.

Figure 13:
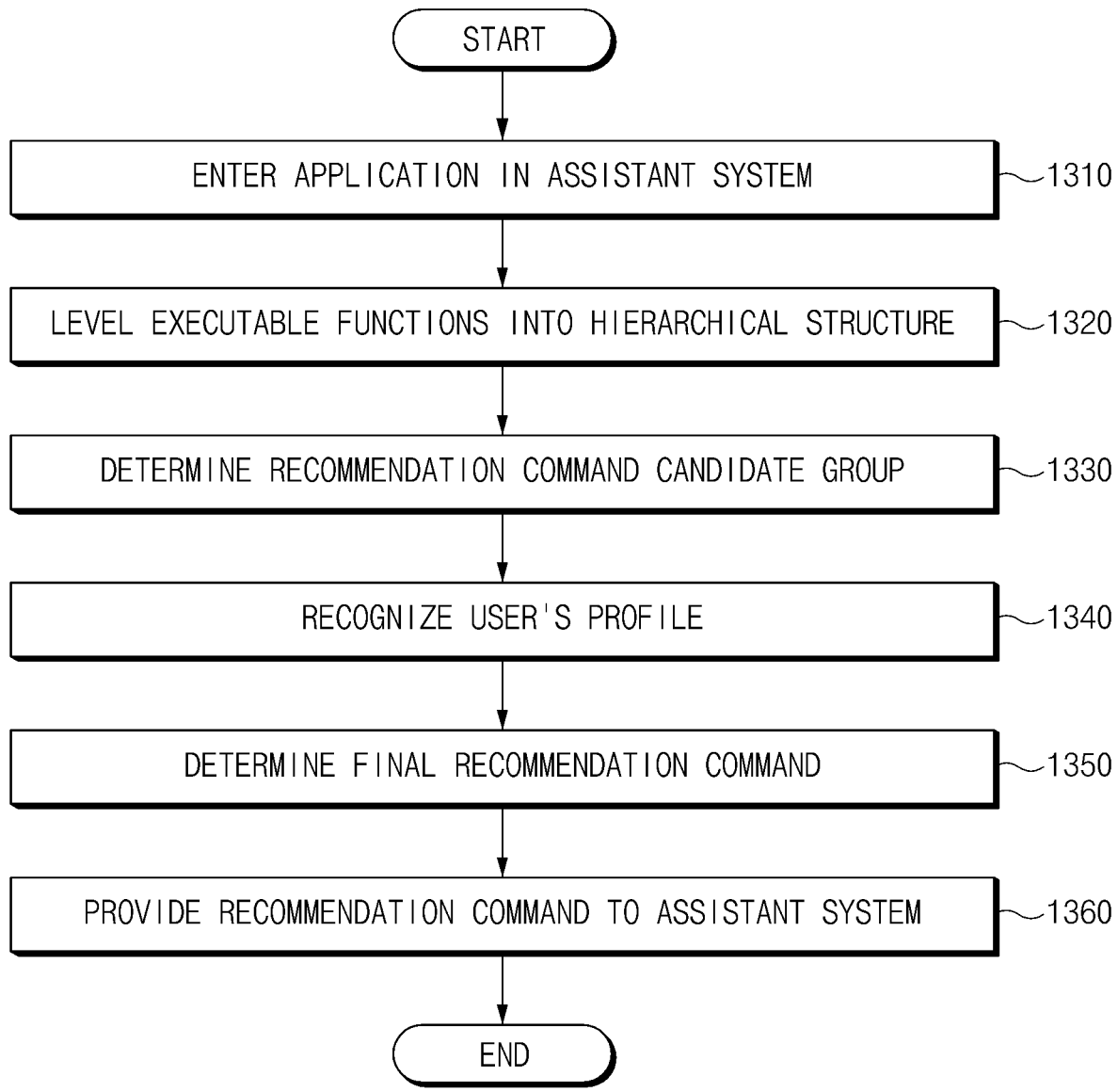
FIG. 13 is a flowchart of a method of operating an electronic device, according to an embodiment of the disclosure.

FIG. 13 is a flowchart of a method of operating an electronic device, according to an embodiment of the disclosure.

Referring to FIG. 13, according to an embodiment of the disclosure, in operation 1310, an electronic device (e.g., the electronic device 101 of FIG. 1, the user terminal 201 of FIGS. 2 to 4, the electronic device 500 of FIG. 5, or the electronic device 600 of FIG. 6) may enter an application by using an assistant function. For example, the assistant function may support the execution of a function of an application by using voice recognition. The assistant function may be performed by a system (e.g., the integrated intelligent system of FIG. 2) including the electronic device and an external electronic device (an external server). For example, the electronic device may receive a user input through the assistant function, may execute (enter) an application corresponding to the user input, and may perform a function of an application corresponding to the user input.

According to an embodiment of the disclosure, in operation 1320, the electronic device may level executable functions into a hierarchical structure. For example, the electronic device may generate structure information obtained by leveling functions of the application entered in operation 1310 into the hierarchical structure or may obtain the pre-stored structure information of the application from the application. For example, the structure information may include information indicating a level of each of the functions of the application and an association (e.g., an entry path of a user interface corresponding to each of the functions) between the functions.

According to an embodiment of the disclosure, in operation 1330, the electronic device may determine a recommendation command candidate group. For example, the electronic device may determine the recommendation command candidate group based on the structure information obtained in operation 1320. The electronic device may recognize a level of a function currently running based on the structure information and may determine that functions of a level adjacent to the recognized level belong to the recommendation command candidate group. The electronic device may determine that a function having a relation to a function being running belongs to the recommendation command candidate group, based on the structure information.

According to an embodiment of the disclosure, in operation 1340, the electronic device may recognize the user's profile. For example, the user's profile may be determined based on the user's application usage history and/or recommendation command usage history. An operation related to the user profile will be described with reference to FIG. 14 below.

According to an embodiment of the disclosure, in operation 1350, the electronic device may determine a final recommendation command. For example, the electronic device may adjust the recommendation command candidate group based on the user's profile. For example, based on the user's application usage history, the electronic device may exclude at least some recommendation commands from the recommendation command candidate group or may add at least some recommendation commands to the recommendation command candidate group. For example, the electronic device may include a function of at least another application (a different domain) in the recommendation command candidate group based on an application usage history. For example, based on the user's recommendation command usage history, the electronic device may exclude at least some recommendation commands from the recommendation command candidate group or may add at least some recommendation commands to the recommendation command candidate group. The electronic device may recognize a preference of a recommendation command (function), a priority, and/or a recommendation command usage tendency based on the recommendation command usage history and may change the recommendation command candidate group based on the recognized result.

According to an embodiment of the disclosure, in operation 1360, the electronic device may provide a recommendation command by using an assistant function. For example, the electronic device may provide a user interface including at least one recommendation command by using the assistant function. The electronic device may provide the user with at least one recommendation command included in the recommendation command candidate group determined in operation 1350.

According to an embodiment of the disclosure, the electronic device may determine a method of providing a recommendation command or an order for providing recommendation commands based on the user profile. For example, the electronic device may determine the preference of the user's recommendation command or the recommendation command usage tendency based on the user profile. Based on the determination result, the electronic device may first provide a recommendation command having a high preference or may sort and provide a plurality of recommendation commands in the order of the user's preference.

Figure 14:
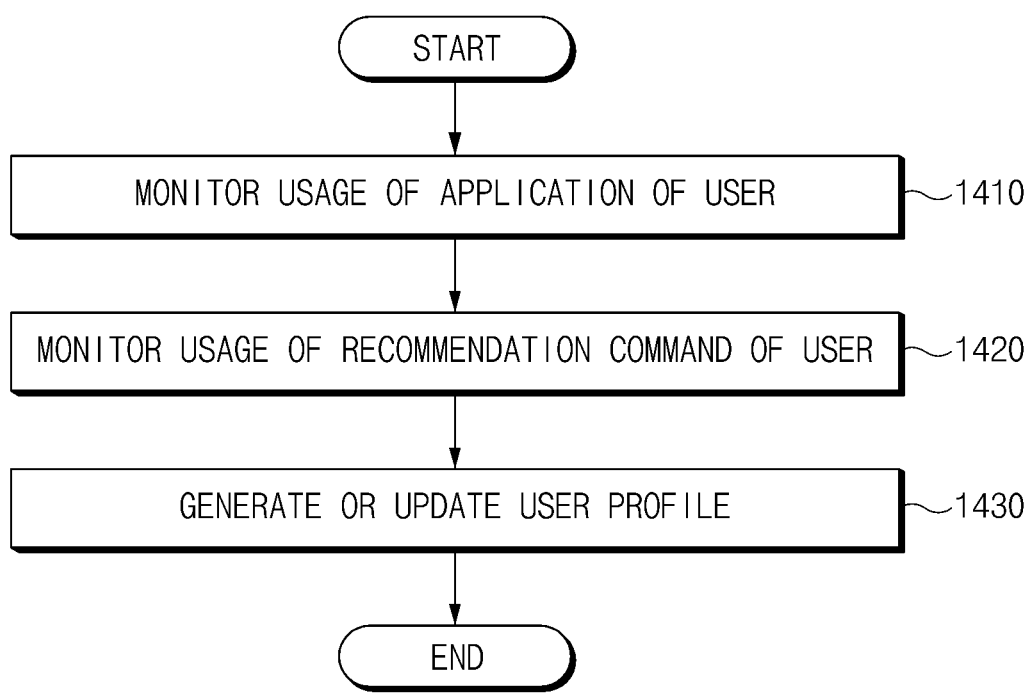
FIG. 14 is a flowchart of an operation of generating a user profile of an electronic device, according to an embodiment of the disclosure.

FIG. 14 is a flowchart of an operation of generating a user profile of an electronic device, according to an embodiment of the disclosure.

Referring to FIG. 14, according to an embodiment of the disclosure, in operation 1410, an electronic device (e.g., the electronic device 101 of FIG. 1, the user terminal 201 of FIGS. 2 to 4, the electronic device 500 of FIG. 5, or the electronic device 600 of FIG. 6) may monitor a usage of an application of a user. For example, the electronic device may monitor a time at which the user has employed an application, a place where the user has employed the application, and a situation in which the user has employed the application, a user input related to the application, and/or a function of the application employed by the user through a user activity log. For example, the electronic device may recognize a history of functions, which are used in connection with each other, from among a function of the application and a function of another application.

According to an embodiment of the disclosure, in operation 1420, the electronic device may monitor the usage of a recommendation command of the user. For example, the electronic device may monitor a priority between a plurality of recommendation commands determined based on a usage frequency of the recommendation command, information of the recommendation command selected by the user, a recommendation command (e.g., whether the user prefers the recommendation command corresponding to a function of a relatively high level or whether the user prefers the recommendation command corresponding to a function of a relatively low level) preferred by the user, and/or the user's selection.

According to an embodiment of the disclosure, in operation 1430, the electronic device may generate or update a user profile. The electronic device may generate or update a user profile based on information obtained by monitoring the user's usage of an application and/or information obtained by monitoring the user's usage of the recommendation command. For example, the user profile may include the user's application usage history and/or recommendation command usage history.

According to an embodiment of the disclosure, the electronic device may determine a range of a recommendation command based at least partly on the user profile generated or updated. The electronic device may provide a recommendation command, which is personalized for each user and suitable for the user, by determining the range of the recommendation command based on the user profile.

According to an embodiment of the disclosure, an operating method of an electronic device may include recognizing a level of a function of an application currently running, based on structure information obtained by classifying functions executable in an application depending on levels, determining a range of a recommendation command to be provided to a user based at least partly on the structure information and the recognized level, and providing a user with at least one recommendation command based on the determined range.

According to an embodiment of the disclosure, the determining of the range of the recommendation command may include determining the range of the recommendation command based at least partly on a profile of a user.

According to an embodiment of the disclosure, the method may further include determining the profile of the user based on at least part of a usage history of the application of a user or a recommendation command usage history of the user.

According to an embodiment of the disclosure, the determining of the range of the recommendation command may include determining the range of the recommendation command to include a recommendation command corresponding to a function having a level higher than the level of the recognized function when a recommendation command usage frequency of a user is greater than or equal to a specified value, and determining the range of the recommendation command to include a recommendation command corresponding to a function having a level lower than or equal to the level of the recognized function when a recommendation command usage frequency of a user is less than a specified value.

According to an embodiment of the disclosure, the determining of the range of the recommendation command may include determining a preference or a priority of a user for each of functions of the application based on a recommendation command usage history of a user, and determining the range of the recommendation command based on the preference or the priority.

According to an embodiment of the disclosure, the determining of the range of the recommendation command may include determining a degree of association between a function of the application thus running and a function of another application based on at least part of the structure information of the application and an application usage history of the user, and including at least one of the function of the another application in the range of the recommendation command based on the determined degree of association.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display;
a memory; and
at least one processor operatively connected to the display and the memory,
wherein the memory stores instructions, when executed by the at least one processor, cause the at least one processor to:
recognize a level of a function of an application currently running, based on structure information obtained by classifying functions executable in the application depending on levels,
determine a range of a recommendation command to be provided to a user based at least partly on the structure information and the recognized level,
provide the user with at least one recommendation command based on the determined range,
determine a degree of association between a function of the application thus running and a function of another application based on at least part of the structure information of the application and an application usage history of the user, and
include at least one of the functions of the other application in the range of the recommendation command based on the determined degree of association.

2. The electronic device of claim 1, wherein the instructions, when executed, cause the at least one processor to:
determine the range of the recommendation command based at least partly on a profile of the user.

3. The electronic device of claim 2, wherein the instructions, when executed, cause the at least one processor to:
determine the profile of the user based on at least part of a usage history of the application of the user or a recommendation command usage history of the user.

4. The electronic device of claim 3, wherein the usage history of the application includes a history of functions, which are used in connection with each other, from among a function of the application and a function of another application.

5. The electronic device of claim 2, wherein the instructions, when executed, cause the at least one processor to:
determine a time point at which the recommendation command is to be provided, based on at least part of the structure information and the profile of the user.

6. The electronic device of claim 5, wherein the time point at which the recommendation command is to be provided includes at least one of a time point at which the application or another application is executed, a time point at which a specified function of the application is executed, a time point at which the electronic device is positioned at a specified location, at a specified time point, or a time point at which an assistant function is used in the electronic device.

7. The electronic device of claim 1, wherein the instructions, when executed, cause the at least one processor to:
obtain the structure information included in the application from the application.

8. The electronic device of claim 1, wherein the instructions, when executed, cause the at least one processor to:
generate the structure information of the application based on at least part of a structure or an entry path of a plurality of user interfaces (UIs) provided by the application.

9. The electronic device of claim 1, wherein the instructions, when executed, cause the at least one processor to:
determine an association between functions of the application based on at least one of the structure information, information included in a user interface corresponding to each function of the application, an association value between functions specified in the application, and a usage history of the application of the user, and
determine the range of the recommendation command based on the determined association.

10. The electronic device of claim 9, wherein the instructions, when executed, cause the at least one processor to:
determine the association between the functions for each user, and
store information of the determined association between the functions for each user in the memory.

11. The electronic device of claim 1, wherein the instructions, when executed, cause the at least one processor to:
when a recommendation command usage frequency of the user is greater than or equal to a specified value, determine the range of the recommendation command to include a recommendation command corresponding to a function having a level higher than the level of the recognized function, and
when the recommendation command usage frequency of the user is less than the specified value, determine the range of the recommendation command to include a recommendation command corresponding to a function having a level lower than or equal to the level of the recognized function.

12. The electronic device of claim 1, wherein the instructions, when executed, cause the at least one processor to:
determine a preference or a priority of the user for each of functions of the application based on a recommendation command usage history of the user, and
determine the range of the recommendation command based on the preference or the priority.

13. The electronic device of claim 12, wherein the instructions, when executed, cause the at least one processor to:
when providing a plurality of recommendation commands, determine a method of providing the plurality of recommendation commands or an order for providing the plurality of recommendation commands based on the preference or the priority.

14. A method of operating an electronic device, the method comprising:
recognizing a level of a function of an application currently running, based on structure information obtained by classifying functions executable in the application depending on levels;
determining a range of a recommendation command to be provided to a user based at least partly on the structure information and the recognized level; and
providing the user with at least one recommendation command based on the determined range,
wherein the determining of the range of the recommendation command comprises:
determining a degree of association between a function of the application thus running and a function of another application based on at least part of the structure information of the application and an application usage history of the user; and
including at least one of the functions of the other application in the range of the recommendation command based on the determined degree of association.

15. The method of claim 14, wherein the determining of the range of the recommendation command includes:
determining the range of the recommendation command based at least partly on a profile of the user.

16. The method of claim 15, further comprising:
determining the profile of the user based on at least part of a usage history of the application of the user or a recommendation command usage history of the user.

17. The method of claim 14, wherein the determining of the range of the recommendation command includes:
when a recommendation command usage frequency of the user is greater than or equal to a specified value, determining the range of the recommendation command to include a recommendation command corresponding to a function having a level higher than the level of the recognized function; and
when the recommendation command usage frequency of the user is less than the specified value, determining the range of the recommendation command to include a recommendation command corresponding to a function having a level lower than or equal to the level of the recognized function.

18. The method of claim 14, wherein the determining of the range of the recommendation command includes:
determining a preference or a priority of the user for each of functions of the application based on a recommendation command usage history of the user; and
determining the range of the recommendation command based on the preference or the priority.

* * * * *